US012681040B2

(12) United States Patent     (10) Patent No.:   US 12,681,040 B2

Komizo     (45) Date of Patent:     Jul. 14, 2026

(54) PHYSICAL QUANTITY SENSOR AND INERTIAL MEASUREMENT UNIT

(71) Applicant: SEIKO EPSON CORPORATION, Tokyo (JP)

(72) Inventor: Koichiro Komizo, Suwa (JP)

(73) Assignee: SEIKO EPSON CORPORATION (JP)

( * ) Notice: Subject to any disclaimer, the term of this patent is extended or adjusted under 35 U.S.C. 154(b) by 288 days.

(21) Appl. No.: 18/446,537

(22) Filed: Aug. 9, 2023

(65) Prior Publication Data

US 2024/0053378 A1     Feb. 15, 2024

(30) Foreign Application Priority Data

Aug. 10, 2022    (JP) ................................ 2022-127733

(51) Int. Cl.
    *G01P 15/125*      (2006.01)
    *G01P 15/08*      (2006.01)

(52) U.S. Cl.
    CPC .... *G01P 15/125* (2013.01); *G01P 2015/0882* (2013.01)

(58) Field of Classification Search
    CPC .................................................... G01P 15/125
    USPC ...................................................... 73/514.01
    See application file for complete search history.

(56) References Cited

U.S. PATENT DOCUMENTS 8,497,619 B2 *   7/2013   Medhat ................... H02N 1/008
                                             318/116
2002/0158293 A1   10/2002   Lee et al.

| | | | |
|---|---|---|---|
| 2006/0213268 A1 | 9/2006 | Asami et al. | |
| 2007/0119252 A1 | 5/2007 | Adams et al. | |
| 2016/0332864 A1 | 11/2016 | Iihola et al. | |
| 2016/0332872 A1 | 11/2016 | Iihola et al. | |
| 2018/0321038 A1 | 11/2018 | Liukku et al. | |
| 2018/0321275 A1 | 11/2018 | Liukku et al. | |
| 2019/0187171 A1 * | 6/2019 | Takizawa | G01P 15/0802 |
| 2020/0158751 A1 * | 5/2020 | Malvern | G01P 15/13 |

(Continued)

FOREIGN PATENT DOCUMENTS

JP     2003-014778 A     1/2003
JP     2006-266873 A     10/2006

(Continued)

*Primary Examiner* — Walter L Lindsay, Jr.
*Assistant Examiner* — Philip T Fadul
(74) *Attorney, Agent, or Firm* — Harness, Dickey & Pierce, P.L.C.

(57)          ABSTRACT

According to a physical quantity sensor, a first movable electrode group, a second movable electrode group, a third movable electrode group, and a fourth movable electrode group are arranged in this order along a first direction. In a third direction, a thickness of a second movable electrode in the second movable electrode group and a thickness of a third movable electrode in the third movable electrode group are different from a thickness of a first movable electrode in the first movable electrode group and a thickness of a fourth movable electrode in the fourth movable electrode group. When an imaginary line extending in a second direction from a center of a fixed portion is an axis of symmetry, the first movable electrode is disposed line-symmetrically with the fourth movable electrode, and the second movable electrode is disposed line-symmetrically with the third movable electrode.

6 Claims, 12 Drawing Sheets

(56)        References Cited

U.S. PATENT DOCUMENTS

2020/0408803  A1      12/2020  Konno et al.
2021/0123944  A1*      4/2021  Tanaka ................ G01P 15/0802
2021/0140995  A1*      5/2021  Reinke .................. G01P 15/125
2021/0171337  A1      6/2021  Liukku et al.
2023/0349945  A1*    11/2023  Takizawa .............. G01P 15/125

FOREIGN PATENT DOCUMENTS

JP          2009-500635  A      1/2009
JP          2018-515353  A      6/2018
JP          2019-023613  A      2/2019
JP          2019-023614  A      2/2019
JP          2021-004875  A      1/2021
JP          2021-524035  A      9/2021

* cited by examiner

| OPERATION | INITIAL STATE | | DIRECTION OF ACCELERATION | | | |
|---|---|---|---|---|---|---|
| | | | Z(+) | | Z(−) | |
| | N-TYPE DETECTOR | P-TYPE DETECTOR | N-TYPE DETECTOR | P-TYPE DETECTOR | N-TYPE DETECTOR | P-TYPE DETECTOR |
| | 11  21 | 22  12 | 11  21 STATIC CAPACITANCE DECREASES | 22  12 NO CHANGE IN STATIC CAPACITANCE | 11  21 NO CHANGE IN STATIC CAPACITANCE | 22  12 STATIC CAPACITANCE DECREASES |

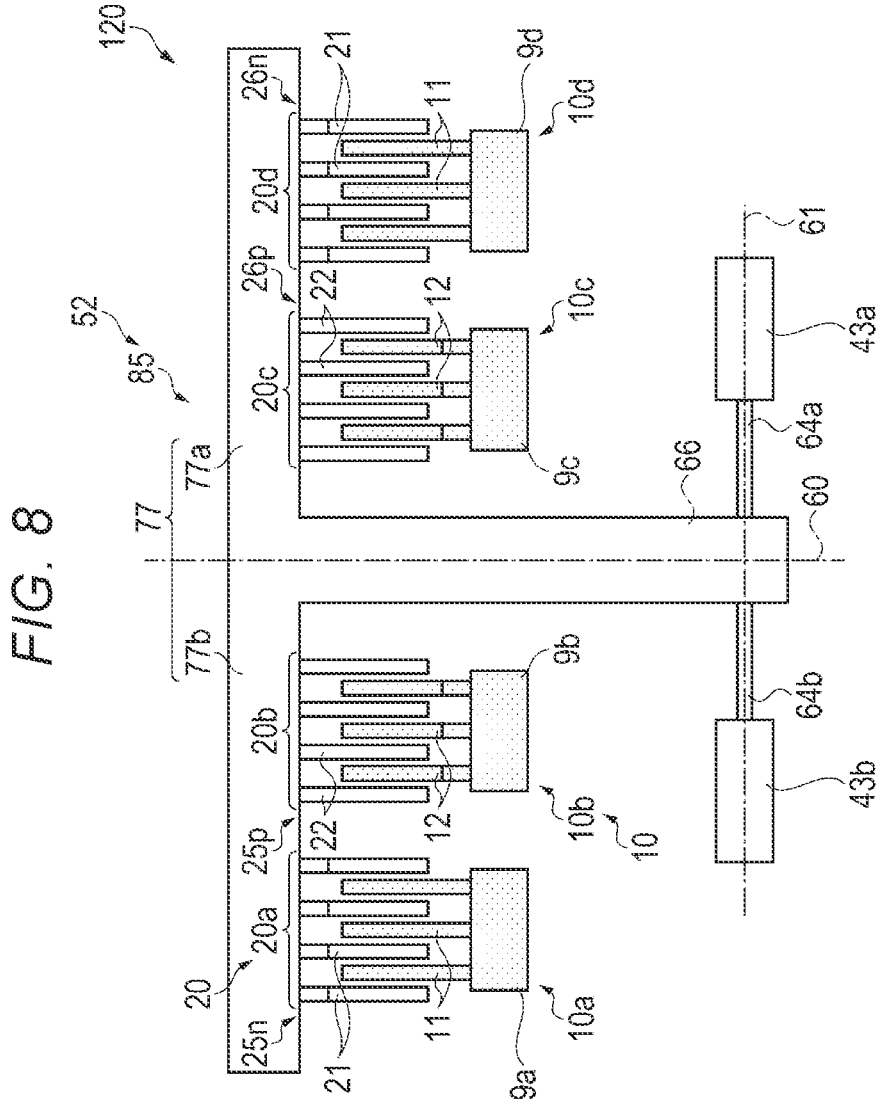
FIG. 8
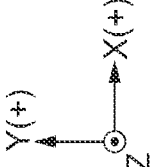

PHYSICAL QUANTITY SENSOR AND INERTIAL MEASUREMENT UNIT

The present application is based on, and claims priority from JP Application Serial Number 2022-127733, filed Aug. 10, 2022, the disclosure of which is hereby incorporated by reference herein in its entirety.

BACKGROUND

1. Technical Field

The present disclosure relates to a physical quantity sensor and an inertial measurement unit including the physical quantity sensor.

2. Related Art

As an example of a physical quantity sensor, an acceleration sensor and an angular velocity sensor using a silicon micro electro mechanical system (MEMS) technique have been developed.

For example, JP-A-2021-524035 discloses a capacitive microelectromechanical acceleration sensor including a proof mass which is a partially movable frame. According to JP-A-2021-524035, when the sensor receives acceleration in a direction of a sense axis, the proof mass moves in the direction of the sense axis, and acceleration in a Z axis direction, for example, is measured based on a change in static capacitance between rotor measurement plates and stator measurement plates at that time. The rotor measurement plates correspond to a movable electrode, and the stator measurement plates correspond to a fixed electrode.

In such an acceleration sensor, when a thicknesses of the movable electrode and the fixed electrode in a Z direction are the same, the same capacitance change occurs when the proof mass as a movable body moves in a Z plus direction or in a Z minus direction, and it is difficult to distinguish positive and negative directions at a detection axis. In response to this problem, the positive and negative directions at the detection axis can be distinguished by reducing the thickness of the movable electrode in some detectors and reducing the thickness of the fixed electrode in other detectors.

JP-A-2021-524035 discloses that either the rotor measurement plates or the stator measurement plates may be recessed in a vertical direction so that an upper edge or a lower edge of the rotor measurement plates is positioned at different Z coordinates, but not disclose that the positive and negative directions at the detection axis are distinguished by this arrangement.

However, when the thicknesses of the movable electrode and the fixed electrode are devised, detection accuracy may be lowered due to factors such as an increase in sensitivity of other axes due to occurrence of torsion or distortion caused by loss of a weight balance of the movable body.

SUMMARY

A physical quantity sensor according to an aspect of the present application is a physical quantity sensor for detecting a physical quantity in a third direction when directions orthogonal to one another are a first direction, a second direction, and the third direction. The physical quantity sensor includes: a fixed portion fixed to a base body; a support beam having one end coupled to the fixed portion; a fixed electrode portion provided at the base body and including a first fixed electrode group, a second fixed electrode group, a third fixed electrode group, and a fourth fixed electrode group; a movable electrode portion including a first movable electrode group having a movable electrode facing a fixed electrode in the first fixed electrode group, a second movable electrode group having a movable electrode facing a fixed electrode in the second fixed electrode group, a third movable electrode group having a movable electrode facing a fixed electrode in the third fixed electrode group, and a fourth movable electrode group having a movable electrode facing a fixed electrode in the fourth fixed electrode group; and a movable body including the movable electrode portion. The first movable electrode group, the second movable electrode group, the third movable electrode group, and the fourth movable electrode group are arranged in this order in the first direction. A thickness of the movable electrode in the second movable electrode group and a thickness of the movable electrode in the third movable electrode group are different from a thickness of the movable electrode in the first movable electrode group and a thickness of the movable electrode in the fourth movable electrode group. When an imaginary line extending in the second direction from a center of the fixed portion is an axis of symmetry, the movable electrode in the first movable electrode group is disposed line-symmetrically with the movable electrode in the fourth movable electrode group, and the movable electrode in the second movable electrode group is disposed line-symmetrically with the movable electrode in the third movable electrode group.

An inertial measurement unit according to an aspect of the present application includes: the physical quantity sensor described above; and a controller configured to perform control based on a detection signal output from the physical quantity sensor.

BRIEF DESCRIPTION OF THE DRAWINGS

FIG. 8 is a plan view of a sensor element according to a third embodiment.

DESCRIPTION OF EMBODIMENTS

First Embodiment

Configuration of Physical Quantity Sensor

Figure 1:
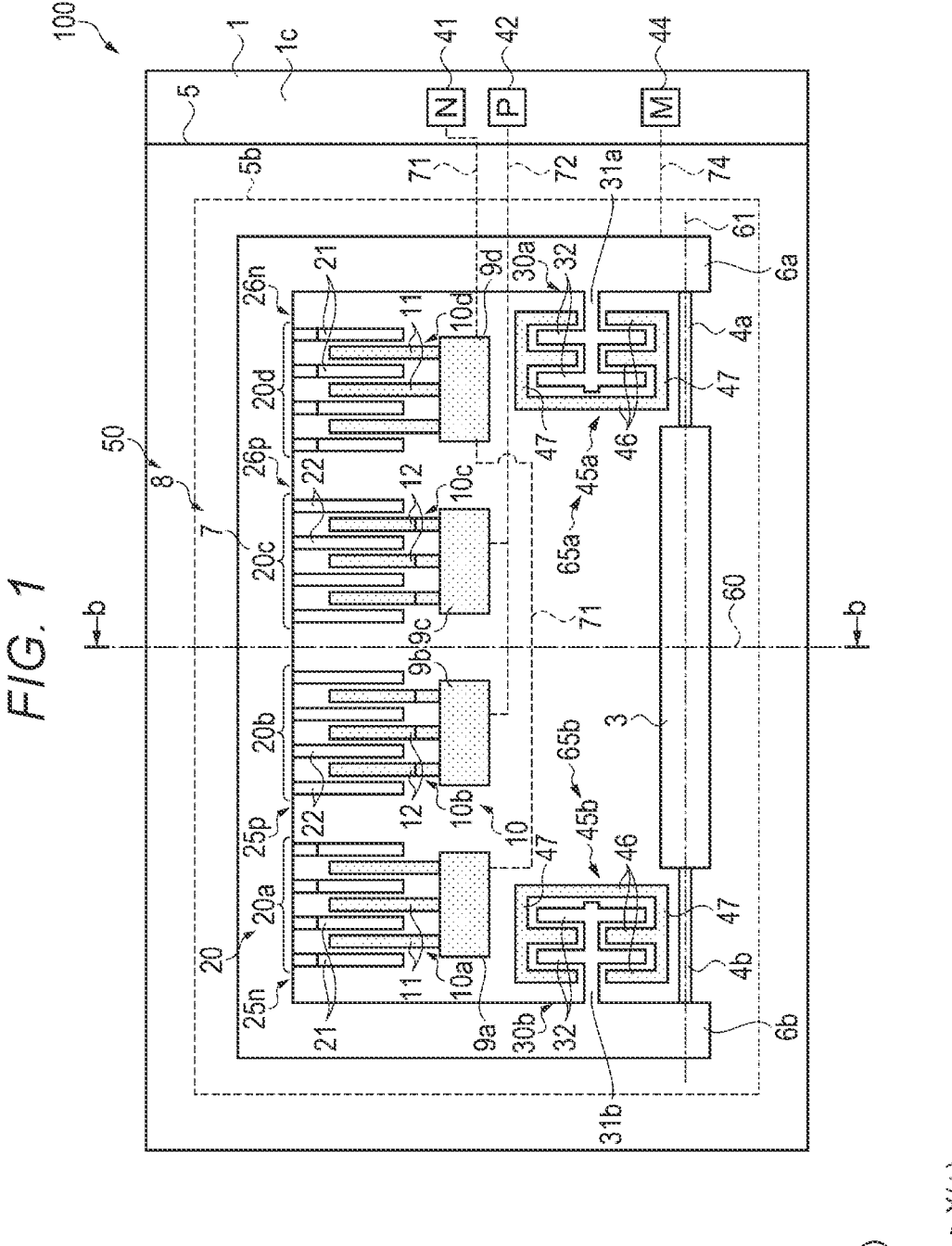
FIG. 1 is a plan view of an acceleration sensor according to a first embodiment.
Figure 2:
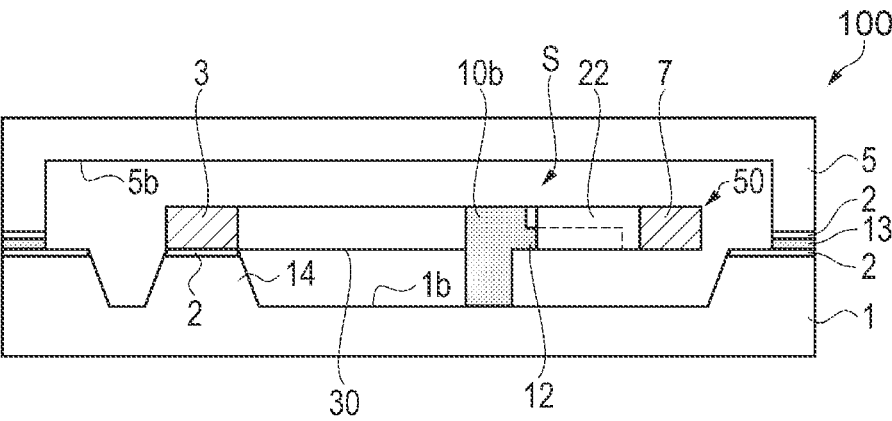
FIG. 2 is a cross-sectional view of the acceleration sensor taken along a line b-b in FIG. 1.
Figure 2:
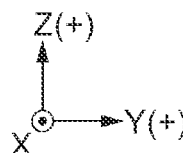

FIG. 1 is a plan view of an acceleration sensor according to a first embodiment. FIG. 2 is a cross-sectional view of the acceleration sensor taken along a line b-b in FIG. 1.

First, an acceleration sensor 100 shown in FIGS. 1 and 2 will be described as an example of a physical quantity sensor according to the embodiment. The acceleration sensor 100 is, for example, an acceleration sensor for detecting acceleration in a vertical direction. In each of the drawings, an X axis, a Y axis, and a Z axis, which are three axes orthogonal to one another, are shown. In the embodiment, a Z axis direction is the vertical direction, but the present disclosure is not limited thereto. A plus direction of the X axis is also referred to as a first direction, a plus direction of the Y axis is also referred to as a second direction, and a plus direction of the Z axis is also referred to as a third direction. The plus direction and a minus direction are also collectively referred to as an X direction, a Y direction, and a Z direction. The physical quantity sensor is also referred to as an inertial sensor.

The acceleration sensor 100 is a uniaxial acceleration sensor including a MEMS device.

The acceleration sensor 100 includes a base body 1, a sensor element 50 disposed on the base body 1, a lid body 5 covering the sensor element 50, and the like.

As the base body 1, for example, a silicon substrate made of semiconductor silicon or a glass substrate made of a glass material such as borosilicate glass is used. A material is not limited thereto, and a quartz substrate, a silicon on insulator (SOI) substrate by wafer direct bonding, and the like may be used.

As shown in FIG. 2, the base body 1 made of an SOI substrate is provided with a recess 1b recessed from a peripheral edge thereof. The recess 1b is a portion forming a housing space S for housing the sensor element 50. The recess 1b is provided with a protruding mount 14 protruding from a bottom surface of the recess 1b.

A fixed portion 3 for the sensor element 50 is fixed to the mount 14 via an embedded insulating layer 2. In other words, the sensor element 50 is fixed to the base body 1 at the fixed portion 3. In a preferred example, the fixed portion 3 is directly bonded to the mount 14.

The sensor element 50 is formed by, for example, etching and patterning a conductive silicon substrate doped with impurities such as phosphorus (P), boron (B), and arsenic (As). In a preferred example, the sensor element 50 processed using a deep etching technique by a Bosch process is used.

As a preferred example, a silicon substrate is used as the lid body 5. A glass substrate or a ceramic substrate may be used. The lid body 5 is provided with a recess 5b which is recessed from a peripheral edge thereof. The recess 5b is a portion forming the housing space S for housing the sensor element 50.

In a preferred example, the base body 1 and the lid body 5 are bonded to each other via a glass frit 13 made of low-melting-point glass. A bonding method may be anodic bonding, or may be activation bonding, diffusion bonding, metal eutectic bonding, and the like.

In a preferred example, the housing space S is filled with an inert gas such as nitrogen, helium, or argon, and is hermetically sealed. An inside of the housing space S is preferably at a substantially atmospheric pressure in a working temperature environment of about −40° C. to 120° C.

As shown in FIG. 1, the sensor element 50 includes the fixed portion 3, a movable body 8, and a first rotation spring 4a and a second rotation spring 4b as support beams coupling the fixed portion 3 to the movable body 8. The movable body 8 is swingable around a swing axis 61 passing through a center of the fixed portion 3 along the X axis.

The first rotation spring 4a is a first support beam, one end of which is fixed to the fixed portion 3, and extends in the first direction (the plus direction of the X axis). The second rotation spring 4b is a second support beam, one end of which is fixed to the fixed portion 3, and extends in a minus direction of the X axis which is an opposite direction of the first direction. In other words, the support beam includes the first rotation spring 4a having one end fixed to the fixed portion 3 and extending in the first direction, and the second rotation spring 4b having one end fixed to the fixed portion 3 and extending in the opposite direction of the first direction. In a preferred example, the first rotation spring 4a and the second rotation spring 4b are torsion springs, and are provided at both sides of the fixed portion 3. In a preferred example, the first rotation spring 4a, the fixed portion 3, and the second rotation spring 4b are integrated and disposed on the swing axis 61.

The movable body 8 includes a first coupling portion 6a extending from the other end of the first rotation spring 4a in the plus direction of the Y axis, a second coupling portion 6b extending from the other end of the second rotation spring 4b in the plus direction of the Y axis, and a base 7 which is a beam coupling the first coupling portion 6a to the second coupling portion 6b. In a preferred example, the movable body 8 is configured such that a mass of the base 7 at a tip end is large. In other words, a mass of the base 7 is larger than those of the first coupling portion 6a and the second coupling portion 6b. The configuration is to increase moment of inertia about the swing axis 61. In other words, the movable body 8 includes the first coupling portion 6a having one end coupled to the other end of the first rotation spring 4a and extending in the second direction (plus direction of the Y axis), the second coupling portion 6b having one end coupled to the other end of the second rotation spring 4b and extending in the second direction, and the base 7 coupling the first coupling portion 6a to the second coupling portion 6b and extending in the first direction (plus direction of the X axis).

With such a configuration, the sensor element 50 is configured as an acceleration sensor having a so-called one-side seesaw structure in which the movable body 8 swings about the swing axis 61.

The first coupling portion 6a and the second coupling portion 6b are provided line-symmetrically with the center line 60 as an axis of symmetry. The center line 60 is an imaginary line, and is a line segment passing through the center of the fixed portion 3 and extending along the Y axis. The base 7 is also provided line-symmetrically with the center line 60 as the axis of symmetry.

The base 7 is provided with a movable electrode portion 20. The movable electrode portion 20 includes a movable electrode group 20a as a first movable electrode group, a movable electrode group 20b as a second movable electrode group, a movable electrode group 20c as a third movable electrode group, and a movable electrode group 20d as a fourth movable electrode group. The movable electrode group 20a includes four movable electrodes 21 extending from the base 7 in a minus direction of the Y axis. The four movable electrodes 21 are provided in a comb teeth shape at equal pitches along an extending direction of the base 7.

Similarly, the movable electrode group 20b includes four movable electrodes 22 extending from the base 7 in the minus direction of the Y axis. The four movable electrodes 22 are provided in a comb teeth shape at equal pitches along the extending direction of the base 7. The number of the movable electrodes 21 and 22 is not limited to four, and may be any number as long as the number is plural, for example, eight or ten.

The movable electrode group 20c is an electrode group paired with the movable electrode group 20b, and includes four movable electrodes 22 extending from the base 7 in the minus direction of the Y axis. The movable electrode group 20c is provided line-symmetrically with the movable electrode group 20b with the center line 60 as the axis of symmetry.

The movable electrode group 20d is an electrode group paired with the movable electrode group 20a, and includes four movable electrodes 21 extending from the base 7 in the minus direction of the Y axis. The movable electrode group 20d is provided line-symmetrically with the movable electrode group 20a with the center line 60 as the axis of symmetry.

The base body 1 is provided with a fixed electrode portion 10 facing the movable electrode portion 20. The fixed electrode portion 10 includes a fixed electrode group 10a as a first fixed electrode group, a fixed electrode group 10b as a second fixed electrode group, a fixed electrode group 10c as a third fixed electrode group, and a fixed electrode group 10d as a fourth fixed electrode group.

The fixed electrode group 10a includes a pedestal 9a provided at the base body 1 and three fixed electrodes 11 extending from the pedestal 9a in the plus direction of the Y axis. The three fixed electrodes 11 are provided in a comb teeth shape at equal pitches so as to be accommodated in gaps among the four movable electrodes 21 in the movable electrode group 20a. Accordingly, the fixed electrode 11 and the movable electrode 21 face each other in the X direction.

The fixed electrode group 10b includes a pedestal 9b provided at the base body 1 and three fixed electrodes 12 extending from the pedestal 9b in the plus direction of the Y axis. The three fixed electrodes 12 are provided in a comb teeth shape at equal pitches so as to be accommodated in gaps among the four movable electrodes 22 in the movable electrode group 20b. Accordingly, the fixed electrode 12 and the movable electrode 22 face each other in the X direction.

The fixed electrode group 10c is an electrode group paired with the fixed electrode group 10b, and includes a pedestal 9c provided at the base body 1 and three fixed electrodes 12 extending from the pedestal 9c in the plus direction of the Y axis. The three fixed electrodes 12 are provided in a comb teeth shape at equal pitches so as to be accommodated in gaps among the four movable electrodes 22 in the movable electrode group 20c. Accordingly, the fixed electrode 12 and the movable electrode 22 face each other in the X direction. The fixed electrode group 10c may be provided line-symmetrically with the fixed electrode group 10b with the center line 60 as the axis of symmetry.

The fixed electrode group 10d is an electrode group paired with the fixed electrode group 10a, and includes a pedestal 9d provided at the base body 1 and three fixed electrodes 11 extending from the pedestal 9d in the plus direction of the Y axis. The three fixed electrodes 11 are provided in a comb teeth shape at equal pitches so as to be accommodated in gaps among the four movable electrodes 21 in the movable electrode group 20d. The fixed electrode group 10d may be provided line-symmetrically with the fixed electrode group 10a with the center line 60 as the axis of symmetry. Accordingly, the fixed electrode 11 and the movable electrode 21 face each other in the X direction. The number of the fixed electrodes 11 and 12 is not limited to three, and may be any number corresponding to the number of the movable electrodes 21 and 22. For example, when the number of the movable electrodes 21 is eight, the number of the fixed electrodes 11 is seven.

In other words, the fixed electrode portion 10 includes the fixed electrode group 10a, the fixed electrode group 10b, the fixed electrode group 10c, and the fixed electrode group 10d provided at the base body 1. The movable electrode portion 20 includes the movable electrode group 20a having the movable electrodes 21 facing the fixed electrodes 11 in the fixed electrode group 10a, the movable electrode group 20b having the movable electrodes 22 facing the fixed electrodes 12 in the fixed electrode group 10b, the movable electrode group 20c having the movable electrodes 22 facing the fixed electrodes 12 in the fixed electrode group 10c, and the movable electrode group 20d having the movable electrodes 21 facing the fixed electrodes 11 in the fixed electrode group 10d. The movable electrode group 20a, the movable electrode group 20b, the movable electrode group 20c, and the movable electrode group 20d are arranged in this order at the base 7 in the first direction (the plus direction of the X axis).

Configuration of Fixed Electrode, Movable Electrode and Detector

Figure 3:
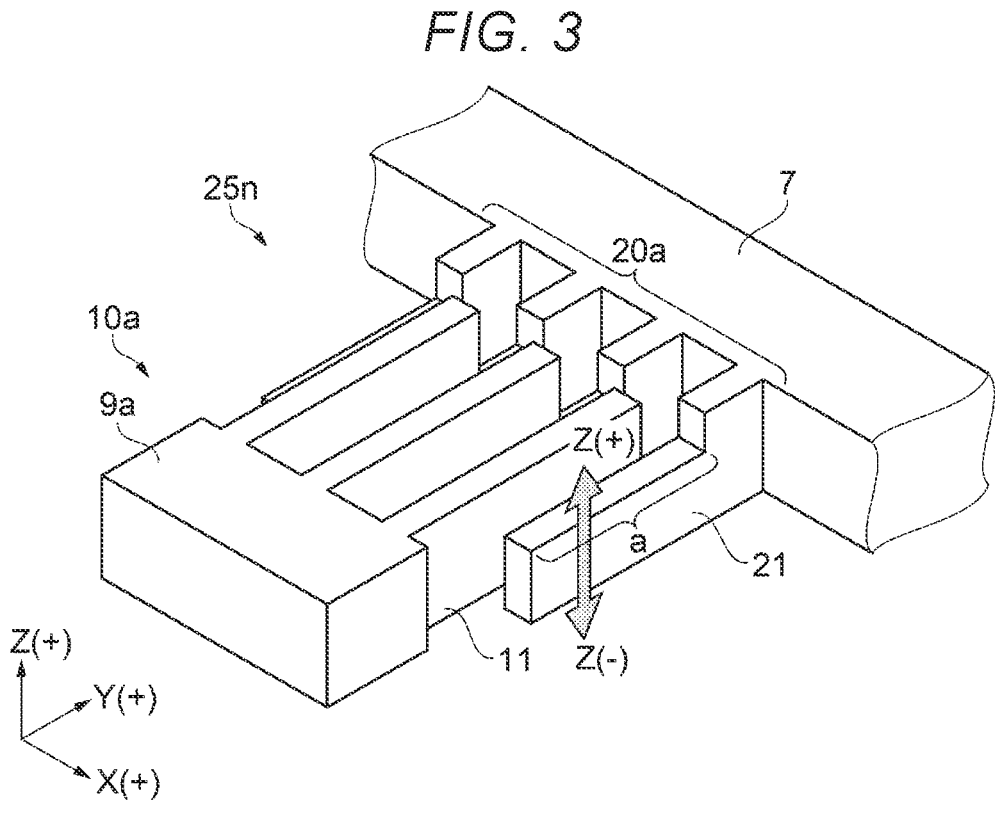
FIG. 3 is a perspective view showing a three-dimensional shape of electrode groups.

FIG. 3 is a perspective view showing a three-dimensional shape of electrode groups, and is a perspective view of the fixed electrode group 10a and the movable electrode group 20a.

As shown in FIG. 3, a thickness of each of the movable electrodes 21 in the Y direction is partially recessed. Specifically, in the movable electrode 21, a thickness of a portion indicated by a range a is reduced in the Y direction. In other words, the movable electrode 21 is cut out stepwise in the middle of the Y axis in the minus direction from the same thickness as that of the base 7 at a root, and becomes thin. Accordingly, all of the four movable electrodes 21 have a small thickness at a plus side of the Z axis, in portions facing the fixed electrodes 11 in the fixed electrode group 10a.

Here, a detector including the fixed electrode group 10a and the movable electrode group 20a is referred to as an N-type detector 25n. In the N-type detector 25n, parallel plate type capacitance is formed by the fixed electrode 11 and the movable electrode 21 facing each other. The capacitance changes in accordance with a change in an overlapping area between the fixed electrode 11 and the movable electrode 21 in accordance with displacement of the movable electrode 21 due to acceleration.

Similarly, a detector including the fixed electrode group 10d (FIG. 1) and the movable electrode group 20d is referred to as an N-type detector 26n. The N-type detector 26n is an N-type detector paired with the N-type detector 25n, and is provided line-symmetrically with the N-type detector 25n with the center line 60 as the axis of symmetry.

Figure 4:
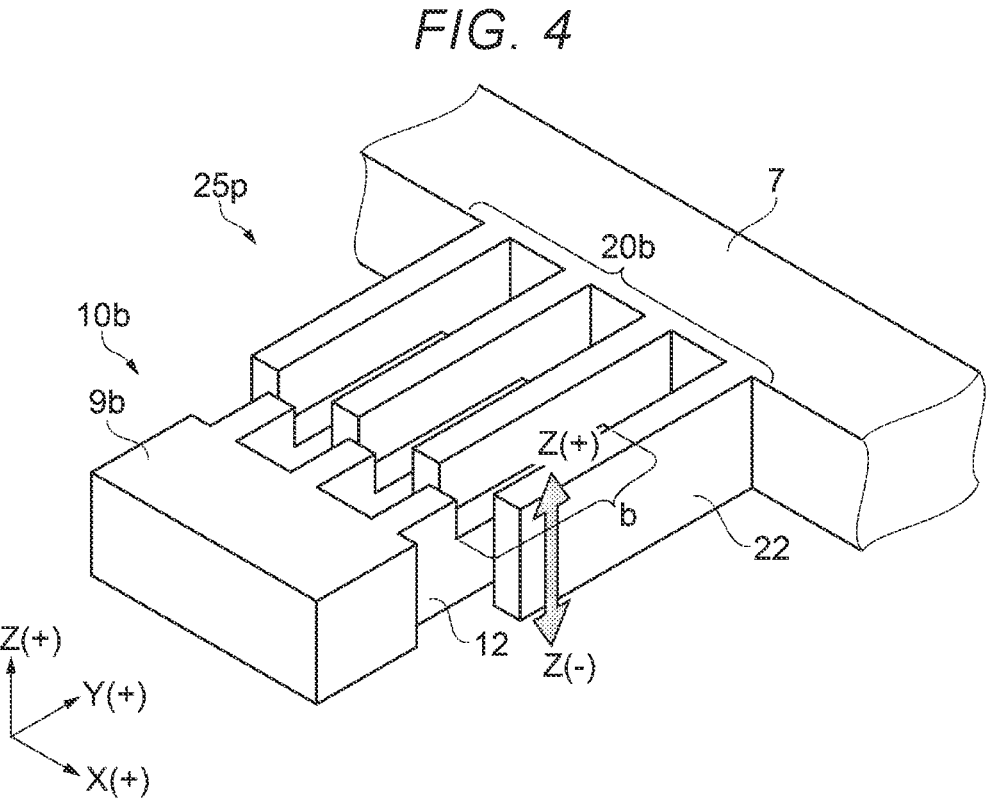
FIG. 4 is a perspective view showing a three-dimensional shape of electrode groups.

FIG. 4 is a perspective view showing a three-dimensional shape of electrode groups, and is a perspective view of the fixed electrode group 10b and the movable electrode group 20b.

As shown in FIG. 4, a thickness of each of the fixed electrodes 12 in a Y axis direction is partially recessed. Specifically, in the fixed electrode 12, a thickness of a portion indicated by a range b is reduced in the Y direction. In other words, the fixed electrode 12 is cut out stepwise in the middle of the Y axis in the plus direction from the same thickness as that of the pedestal 9*b* at a root, and becomes thin. Accordingly, all of the three fixed electrodes 12 have a small thickness at the plus side of the Z axis, in portions facing the movable electrodes 22 in the movable electrode group 20*b*.

Here, a detector including the fixed electrode group 10*b* and the movable electrode group 20*b* is referred to as a P-type detector 25*p*. In the P-type detector 25*p*, parallel plate type capacitance is formed by the fixed electrode 12 and the movable electrode 22 facing each other. The capacitance changes in accordance with a change in an overlapping area between the fixed electrode 12 and the movable electrode 22 in accordance with displacement of the movable electrode 22 due to acceleration.

Similarly, a detector including the fixed electrode group 10*c* (FIG. 1) and the movable electrode group 20*c* is referred to as a P-type detector 26*p*. The P-type detector 26*p* is a P-type detector paired with the P-type detector 25*p*, and is provided line-symmetrically with the P-type detector 25*p* with the center line 60 as the axis of symmetry.

In other words, a thickness of each of the movable electrodes 22 in the movable electrode group 20*b* and each of the movable electrodes 22 in the movable electrode group 20*c* is different from a thickness of each of the movable electrodes 21 in the movable electrode group 20*a* and each of the movable electrodes 21 in the movable electrode group 20*d*. The movable electrode 21 in the movable electrode group 20*a* is disposed line-symmetrically with the movable electrode 21 in the movable electrode group 20*d*, and the movable electrode 22 in the movable electrode group 20*b* is disposed line-symmetrically with the movable electrode 22 in the movable electrode group 20*c*, with the center line 60, which is an imaginary line extending from the center of the fixed portion 3 to a plus side and a minus side of the Y axis, as the axis of symmetry.

Detection Principle of Acceleration

Figure 5:
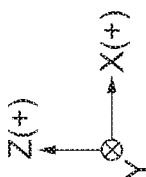
FIG. 5 is a diagram of a detection principle of acceleration.

FIG. 5 is a diagram of a detection principle of acceleration.

In FIG. 5, an initial state is shown at a left side, and acceleration occurs at a right side, with a direction of acceleration being in the plus direction of the Z axis and a direction of acceleration being in a minus direction of the Z axis. Specifically, FIG. 5 shows overlap between the fixed electrode 11 and the movable electrode 21 and overlap between the fixed electrode 12 and the movable electrode 22 in a cross section along an XZ plane. The initial state is a state in which no acceleration, including gravity, occurs in the plus direction of the Z axis and the minus direction of the Z axis. Hereinafter, the plus direction of the Z axis and the minus direction of the Z axis are also referred to as plus/minus directions of the Z axis.

First, in the initial state, in the N-type detector 25*n*, positions of ends of the fixed electrodes 11 and the movable electrodes 21 at the minus side of the Z axis coincide with each other and are flush with each other. Similarly, in the P-type detector 25*p*, positions of ends of the fixed electrode 12 and the movable electrode 22 at the minus side of the Z axis coincide with each other and are flush with each other. An overlapping area between the fixed electrode 11 and the movable electrode 21 in the initial state and an overlapping area between the fixed electrode 12 and the movable electrode 22 in the initial state are also referred to as an initial area.

Next, when acceleration in the plus direction of the Z axis occurs, the movable electrode 21 of the N-type detector 25*n* and the movable electrode 22 of the P-type detector 25*p* are displaced to the minus side of the Z axis by receiving an inertial force accompanying the acceleration. At this time, an overlapping area between the fixed electrode 11 and the movable electrode 21 in the N-type detector 25*n* is smaller than the initial area due to the displacement of the movable electrode 21 in the minus direction of the Z axis. On the other hand, in the P-type detector 25*p*, an overlapping area between the fixed electrode 12 and the movable electrode 22 is maintained at the initial area even when the movable electrode 22 is displaced in the minus direction of the Z axis. In other words, when the movable electrode 22 is displaced in the minus direction of the Z axis, the overlapping area does not change.

Thus, when acceleration in the plus direction of the Z axis occurs, the overlapping area in the N-type detector 25*n* decreases, and the overlapping area in the P-type detector 25*p* is maintained.

Next, when acceleration in the minus direction of the Z axis occurs, the movable electrode 21 of the N-type detector 25*n* and the movable electrode 22 of the P-type detector 25*p* are displaced to the plus side of the Z axis by receiving an inertial force accompanying the acceleration. At this time, the overlapping area between the fixed electrode 11 and the movable electrode 21 in the N-type detector 25*n* is maintained at the initial area even when the movable electrode 21 is displaced in the plus direction of the Z axis. On the other hand, the overlapping area between the fixed electrode 12 and the movable electrode 22 in the P-type detector 25*p* is smaller than the initial area due to the displacement of the movable electrode 22 in the plus direction of the Z axis.

Thus, when acceleration in the minus direction of the Z axis occurs, the overlapping area in the N-type detector 25*n* is maintained, and the overlapping area in the P-type detector 25*p* decreases.

A behavior of the N-type detector 26*n* paired with the N-type detector 25*n* when acceleration in the Z direction is applied is the same as that of the N-type detector 25*n*. Similarly, a behavior of the P-type detector 26*p* paired with the P-type detector 25*p* when acceleration in the Z direction is applied is the same as that of the P-type detector 25*p*.

Based on the above correlation, acceleration in the plus/minus directions of the Z axis can be detected by detecting changes in overlapping areas in the N-type detectors 25*n*, 26*n* and the P-type detectors 25*p*, 26*p* as changes in static capacitance. Specifically, the acceleration in the plus/minus directions of the Z axis can be detected by using a differential amplifier circuit to detect a difference between capacitance in the N-type detectors 25*n*, 26*n* and capacitance in the P-type detectors 25*p*, 26*p*. The differential amplifier circuit is incorporated in a control IC 236 (FIG. 13) to be described later. When acceleration is detected, an AC detection signal is used.

In the above description, a configuration in which cutouts are at the movable electrode 21 and the fixed electrode 12 is described, but the present disclosure is not limited to this configuration. For example, a configuration in which cutouts are at the fixed electrode 11 and the movable electrode 22 may be adopted.

The description returns to FIG. 1.

A protrusion 1*c* protruding from the lid body 5 is provided at a side of the base body 1 at a plus side of the X axis, and a plurality of coupling pads are provided at the protrusion 1*c*.

A coupling pad 41 is electrically coupled to, by a wiring 71, the fixed electrode group 10*a* of the N-type detector 25*n* and the fixed electrode group 10*d* of the N-type detector 26*n*. A coupling pad 42 is electrically coupled to, by a wiring 72, the fixed electrode group 10*b* of the P-type detector 25*p* and the fixed electrode group 10*c* of the P-type detector 26*p*. The coupling pad 44 is electrically coupled to, by a wiring 74, the movable electrode portion 20 via the movable body 8.

The coupling pads 41, 42, and 44 are electrically coupled to the control IC 236 (FIG. 13) via a wiring such as a bonding wire (not shown).

Configuration of Damper

The sensor element 50 is provided with a pair of dampers 65*a*, 65*b*.

The damper 65*a* is provided at a first coupling portion 6*a* side of the movable body 8, and includes a damper movable portion 30*a* and a damper fixed portion 45*a*.

The damper movable portion 30*a* includes a first bar 31*a* branched from the first coupling portion 6*a* in the minus direction of the X axis and two second bars 32.

The two second bars 32 extend in the Y direction and intersect the first bar 31*a* in a cross shape. The two second bars 32 are disposed with a gap therebetween, and a third bar 46 of the damper fixed portion 45*a* is disposed in the gap. The first bar 31*a* and the second bars 32 have the same thickness as the first coupling portion 6*a*.

The damper fixed portion 45*a* is provided at the base body 1, and includes three third bars 46 arranged at equal intervals, and a coupling portion 47 coupling the three third bars 46 at upper and lower sides.

As shown in FIG. 1, the two second bars 32 of the damper movable portion 30*a* and the three third bars 46 of the damper fixed portion 45*a* are arranged in a comb teeth shape with gaps therebetween. Among the three third bars 46, two third bars 46 at the first coupling portion 6*a* side are divided at portions intersecting the first bar 31*a*.

Since both ends of the damper fixed portion 45*a* in the Y direction are coupled by the coupling portion 47, an outer shape of the damper fixed portion 45*a* is rectangular in a plan view, and the damper movable portion 30*a* is surrounded by the damper fixed portion 45*a*. A thickness of the third bars 46 and the coupling portion 47 is the same as that of the first bar 31*a* and the second bars 32.

The damper 65*b* is provided at a second coupling portion 6*b* side of the movable body 8, and is provided line-symmetrically with the damper 65*a* with the center line 60 as the axis of symmetry.

The damper 65*b* includes a damper movable portion 30*b* and a damper fixed portion 45*b*. The damper movable portion 30*b* includes a first bar 31*b* branched from the second coupling portion 6*b* in the plus direction of the X axis and two second bars 32. The two second bars 32 extend in the Y direction and intersect the first bar 31*b* in a cross shape. The two second bars 32 are disposed with a gap therebetween, and the third bar 46 of the damper fixed portion 45*b* is disposed in the gap. The first bar 31*b* and the second bars 32 have the same thickness as the second coupling portion 6*b*.

The damper fixed portion 45*b* is provided at the base body 1, and includes three third bars 46 arranged at equal intervals, and the coupling portion 47 coupling the three third bars 46 at upper and lower sides.

The two second bars 32 of the damper movable portion 30*b* and the three third bars 46 of the damper fixed portion 45*b* are arranged in a comb teeth shape with gaps therebetween. Among the three third bars 46, two third bars 46 at the second coupling portion 6*b* side are divided at portions intersecting the first bar 31*b*.

Since both ends of the damper fixed portion 45*b* in the Y direction are coupled by the coupling portion 47, an outer shape of the damper fixed portion 45*b* is rectangular in a plan view, and the damper movable portion 30*b* is surrounded by the damper fixed portion 45*b*. A thickness of the third bars 46 and the coupling portion 47 is the same as that of the first bar 31*b* and the second bars 32.

Thus, the dampers 65*a*, 65*b* provided left-right symmetrically in the movable body 8 with the center line 60 as the axis of symmetry serve to dampen unnecessary vibration in the movable body 8. Specifically, for example, when the movable body 8 receives acceleration in the X direction and is displaced, the damper movable portion 30*a* of the damper 65*a* is also displaced integrally with the movable body 8. At this time, air resistance in a space between the damper fixed portion 45*a* and the damper movable portion 30*a* prevents displacement in the X direction. The similar applies to the damper 65*b*. When the movable body 8 receives larger acceleration, the damper movable portion 30*a* collides with the damper fixed portion 45*a*, thereby functioning as a stopper.

As described above, when acceleration in directions other than the Z direction occurs in the movable body 8, the dampers 65*a*, 65*b* serve to dampen unnecessary displacement or vibration in the movable body 8 in the directions other than the Z direction. Sensitivity of other axes in the acceleration sensor 100 is reduced.

Effects of Symmetric Configuration

Figure 6:
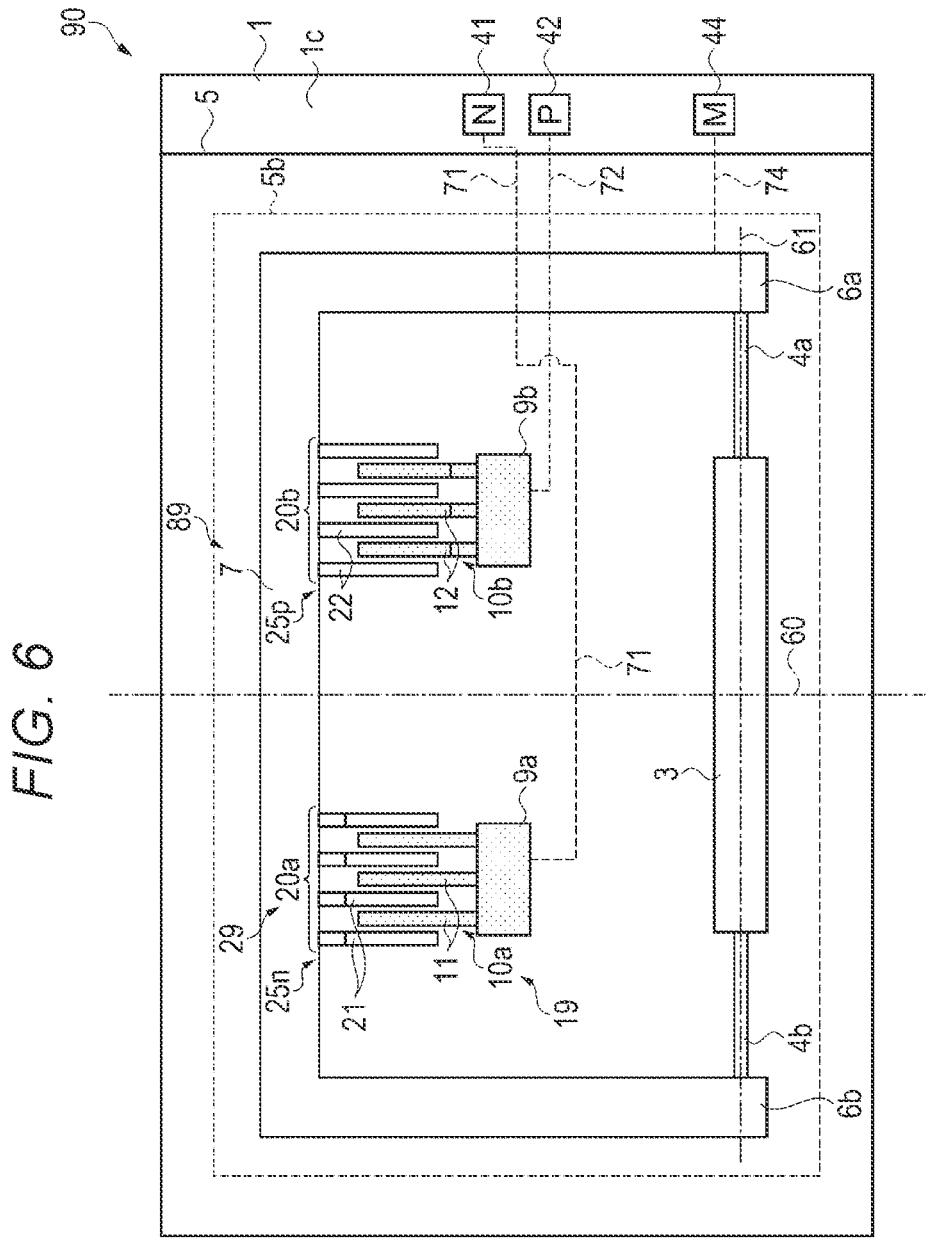
FIG. 6 is a plan view of an acceleration sensor of a comparative example.
Figure 6:
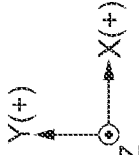

FIG. 6 is a plan view of a physical quantity sensor according to a comparative example and corresponds to FIG. 1.

An acceleration sensor 90 as the physical quantity sensor according to the comparative example shown in FIG. 6 shows an example of a physical quantity sensor in the related art. The same parts as those described in FIG. 1 are denoted by the same reference signs, and redundant description is omitted.

The acceleration sensor 90 of the comparative example is different from the acceleration sensor 100 of the first embodiment in that the two detectors, which are the N-type detector 25*n* and the P-type detector 25*p*, are at the base 7 of the movable body 89, and the dampers 65*a*, 65*b* are not in the acceleration sensor 90. The other configurations are the same as those in FIG. 1.

In the acceleration sensor 90, a movable electrode portion 29 includes the movable electrode group 20*a* and the movable electrode group 20*b*. A fixed electrode portion 19 includes the fixed electrode group 10*a* and the fixed electrode group 10*b*. The fixed electrode group 10*a* and the movable electrode group 20*a* constitute the N-type detector 25*n*, and the fixed electrode group 10*b* and the movable electrode group 20*b* constitute the P-type detector 25*p*.

Here, the N-type detector 25*n* and the P-type detector 25*p* are provided line-symmetrically in a plane with the center line 60 as the axis of symmetry, but a weight balance of the movable body 89 is lost. Specifically, since the movable electrode 21 in the movable electrode group 20*a* is thinner than the movable electrode 22 in the movable electrode group 20*b*, a mass of the movable body 89 in the minus direction of the X axis is reduced accordingly, and the weight balance between left and right is lost. Therefore, in the acceleration sensor 90 of the comparative example, when acceleration is applied, torsion or distortion occurs in swing of the movable body 89, sensitivity of the other axes is increased, and detection accuracy decreases.

In contrast, according to the acceleration sensor 100 of the embodiment, the pair of the N-type detector 25*n* and the P-type detector 25*p* and the pair of the N-type detector 26*n* and the P-type detector 26*p* are provided line-symmetrically with the center line 60 as the axis of symmetry, and thus a weight balance between left and right is achieved. Specifically, by matching the number of the movable electrodes 21 and 22 at a left side (in the minus direction of the X axis) and the number of the movable electrodes 21 and 22 at a right side (in the plus direction of the X axis), centered on the center line 60, a weight at a left and a weight at a right of the base 7 are the same. The present disclosure is not limited to the configuration in which one pair is provided at the left and right, and the same number of pairs may be provided at the left and right. That is, the number of detectors may be six or eight. The number of detectors is preferably a multiple of four. Any symmetric arrangement may be used, for example, a P-type N-type N-type P-type arrangement may be used.

Further, since the dampers 65a, 65b are provided left-right symmetrically, unnecessary vibration of the movable body 8 can be dampened, and the sensitivity of the other axes can be reduced.

As described above, according to the acceleration sensor 100 as the physical quantity sensor of the embodiment, the following effects can be obtained.

The acceleration sensor 100 for detecting a physical quantity in the Z direction as the third direction when directions orthogonal to one another are the first direction, the second direction, and the third direction includes: the fixed portion 3 fixed to the base body 1; the first rotation spring 4a and the second rotation spring 4b as the support beam having the one ends coupled to the fixed portion 3; the fixed electrode portion 10 provided at the base body 1 and including the fixed electrode group 10a as the first fixed electrode group, the fixed electrode group 10b as the second fixed electrode group, the fixed electrode group 10c as the third fixed electrode group, and the fixed electrode group 10d as the fourth fixed electrode group; the movable electrode portion 20 including the movable electrode group 20a as the first movable electrode group having the movable electrode 21 facing the fixed electrode 11 in the fixed electrode group 10a, the movable electrode group 20b as the second movable electrode group having the movable electrode 22 facing the fixed electrode 12 in the fixed electrode group 10b, the movable electrode group 20c as the third movable electrode group having the movable electrode 22 facing the fixed electrode 12 in the fixed electrode group 10c, and the movable electrode group 20d as the fourth movable electrode group having the movable electrode 21 facing the fixed electrode 11 in the fixed electrode group 10d; and the movable body 8 including the movable electrode portion 20. The movable electrode group 20a, the movable electrode group 20b, the movable electrode group 20c, and the movable electrode group 20d are arranged in this order in the first direction. The thickness of the movable electrode 22 in the movable electrode group 20b and the movable electrode 22 in the movable electrode group 20c are different from the thickness of the movable electrode 21 in the movable electrode group 20a and the movable electrode 21 in the movable electrode group 20d. With the center line 60, which is an imaginary line extending in the plus direction of the Y axis from the center of the fixed portion 3, as the axis of symmetry, the movable electrode 21 in the movable electrode group 20a is disposed line-symmetrically with the movable electrode 21 in the movable electrode group 20d, and the movable electrode 22 in the movable electrode group 20b is disposed line-symmetrically with the movable electrode 22 in the movable electrode group 20c.

Accordingly, the number of the movable electrodes 21 and 22 at the left side (in the minus direction of the X axis) and the number of the movable electrodes 21 and 22 at the right side (in the plus direction of the X axis) are the same with the center line 60 as the axis of symmetry, and it is possible to make the weight balance between the left and right of the movable body 8 uniform. Further, since the N-type detector 25n and the P-type detector 25p are disposed at the left side and the N-type detector 26n and the P-type detector 26p are disposed at the right side, the two N-type detectors and the two P-type detectors can detect acceleration which are distinguished in the plus/minus directions of the Z axis.

Therefore, the acceleration sensor 100 has a good weight balance of the movable body 8 and high detection accuracy.

Accordingly, it is possible to provide the acceleration sensor 100 in which the sensitivity of the other axes is reduced and the detection accuracy is high.

The support beam includes the first rotation spring 4a having the one end fixed to the fixed portion 3 and extending in the first direction, and the second rotation spring 4b having the one end fixed to the fixed portion 3 and extending in the opposite direction of the first direction. The movable body 8 includes the first coupling portion 6a having the one end coupled to the other end of the first rotation spring 4a and extending in the second direction, the second coupling portion 6b having the one end coupled to the other end of the second rotation spring 4b and extending in the second direction, and the base 7 coupling the first coupling portion 6a to the second coupling portion 6b and extending in the first direction. The movable electrode group 20a, the movable electrode group 20b, the movable electrode group 20c, and the movable electrode group 20d are coupled to the base 7.

Accordingly, when the first rotation spring 4a and the second rotation spring 4b integrated with the fixed portion 3 are regarded as one side of a fixed shaft, a structurally stable rectangular shape is formed by the fixed shaft and the movable body 8, so that the movable body 8 can swing stably when the movable body 8 swings about the fixed shaft as an axis. In other words, acceleration can be stably detected.

The movable body 8 includes the dampers 65a, 65b which are left-right symmetrically disposed.

Therefore, when acceleration in a direction other than the Z direction occurs in the movable body 8, unnecessary displacement or vibration of the movable body 8 in the direction other than the Z direction can be dampened, and the sensitivity of the other axes can be reduced.

Accordingly, it is possible to provide the acceleration sensor 100 in which the sensitivity of the other axes is reduced and the detection accuracy is high.

Second Embodiment

Different Aspect of Sensor Element-1

Figure 7:
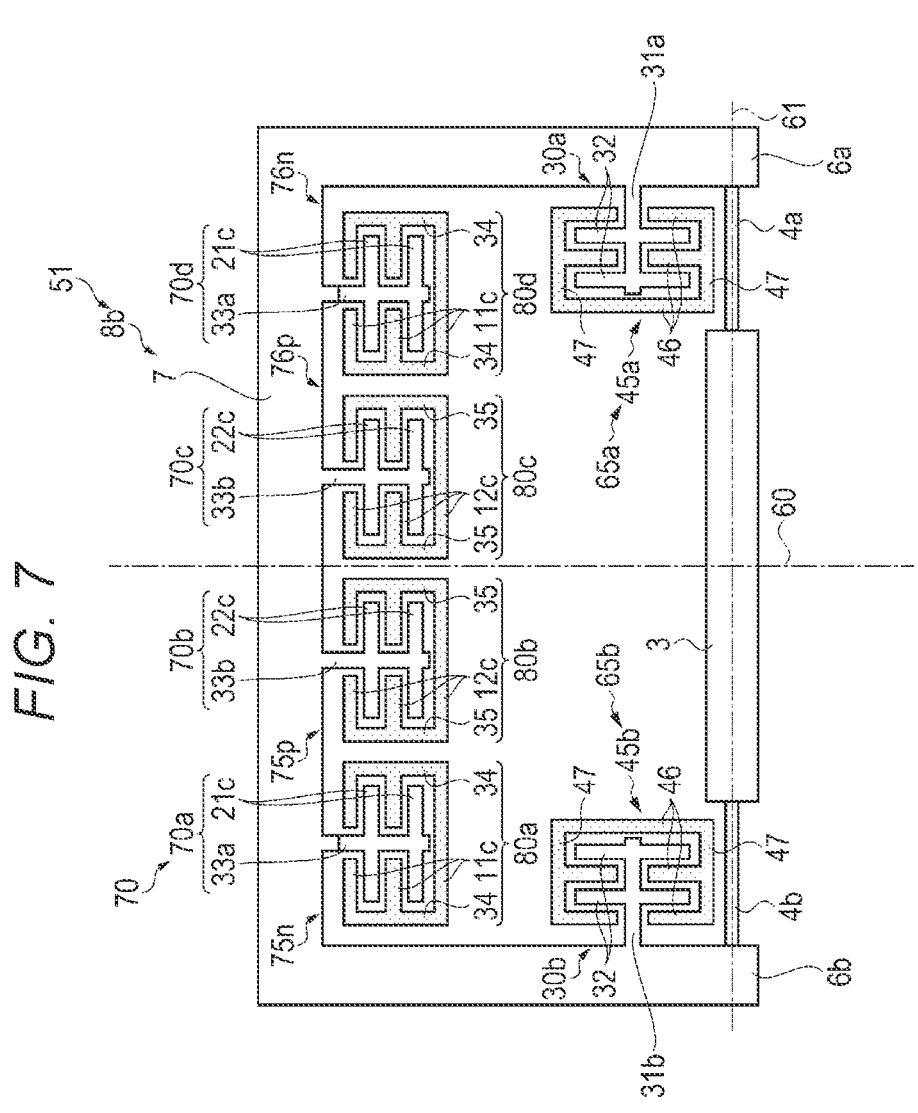
FIG. 7 is a plan view of a sensor element according to a second embodiment.

FIG. 7 is a plan view of a sensor element according to a second embodiment, and corresponds to FIG. 1.

In the above embodiment, the plurality of movable electrodes 21 and 22 protrude from the base 7 in a comb teeth shape in a direction intersecting the base 7, and the plurality of fixed electrodes 11 and 12 face the movable electrodes, but the present disclosure is not limited to this configuration, and any configuration may be used as long as parallel plate type capacitance can be formed between two electrodes.

For example, an acceleration sensor 110 of the embodiment adopts a configuration including movable electrodes 21c, 22c extending in the same direction as the extending direction of the base 7. Hereinafter, the same reference signs are given to the same portions as those of the above embodiment, and redundant description thereof will be omitted.

The acceleration sensor 110 of the embodiment shown in FIG. 7 includes an N-type detector 75n, a P-type detector 75p, a P-type detector 76p, and an N-type detector 76n at the base 7 in this order from the second coupling portion 6b side. In other words, the pair of the N-type detector 75n and the P-type detector 75p and the pair of the N-type detector 76n and the P-type detector 76p are provided line-symmetrically with the center line 60 as an axis of symmetry.

The N-type detector 75n includes a movable electrode group 70a and a fixed electrode group 80a.

The movable electrode group 70a includes an electrode shaft 33a branched from the base 7 in the minus direction of the Y axis and two movable electrodes 21c. The two movable electrodes 21c branch to left and right from a middle of the electrode shaft 33a and extend in the X direction. The two movable electrodes 21c are disposed with a gap therebetween, and a fixed electrode 11c in the fixed electrode group 80a is disposed in the gap.

The fixed electrode group 80a is provided at the base body 1, and includes three fixed electrodes 11c arranged at equal intervals and coupling portions 34 which couple the three fixed electrodes 11c at the left and right.

The two movable electrodes 21c in the movable electrode group 70a and the three fixed electrodes 11c in the fixed electrode group 80a are arranged in a comb teeth shape with gaps therebetween. Among the three fixed electrodes 11c, two fixed electrodes 11c at a base 7 side are divided at a portion intersecting the electrode shaft 33a.

Since both ends in the fixed electrode group 80a in the X direction are coupled by the coupling portions 34, the fixed electrode group 80a has a rectangular outer shape in a plan view, and the movable electrode group 70a is surrounded by the fixed electrode group 80a. With such a configuration, parallel plate type capacitance is formed between the movable electrode 21c and the fixed electrode 11c, and it is possible to detect a capacitance change caused by swinging of a movable body 8b.

The P-type detector 75p includes a movable electrode group 70b and a fixed electrode group 80b.

The movable electrode group 70b includes an electrode shaft 33b branched from the base 7 in the minus direction of the Y axis and two movable electrodes 22c. The two movable electrodes 22c branch to left and right from a middle of the electrode shaft 33b and extend in the X direction. The two movable electrodes 22c are disposed with a gap therebetween, and a fixed electrode 12c in the fixed electrode group 80b is disposed in the gap.

The fixed electrode group 80b is provided at the base body 1, and includes three fixed electrodes 12c arranged at equal intervals and coupling portions 35 which couple the three fixed electrodes 12c at the left and right.

The two movable electrodes 22c in the movable electrode group 70b and the three fixed electrodes 12c in the fixed electrode group 80b are arranged in a comb teeth shape with gaps therebetween. Among the three fixed electrodes 12c, two fixed electrodes 12c at the base 7 side are divided at a portion intersecting the electrode shaft 33b.

Since both ends in the fixed electrode group 80b in the X direction are coupled by the coupling portions 35, the fixed electrode group 80b has a rectangular outer shape in a plan view, and the movable electrode group 70b is surrounded by the fixed electrode group 80b. With such a configuration, parallel plate type capacitance is formed between the movable electrode 22c and the fixed electrode 12c, and it is possible to detect a capacitance change caused by swinging of the movable body 8b.

The P-type detector 76p is line-symmetrical to the P-type detector 75p with the center line 60 as the axis of symmetry. The N-type detector 76n is line-symmetrical to the N-type detector 75n with the center line 60 as the axis of symmetry. That is, the pair of the N-type detector 75n and the P-type detector 75p and the pair of the N-type detector 76n and the P-type detector 76p are provided line-symmetrically with the center line 60 as the axis of symmetry.

Here, a thickness of the movable electrode 21c in the movable electrode group 70a in the N-type detector 75n in the Z direction is set to be the same as the thickness of the movable electrode 21 in the movable electrode group 20a of the first embodiment shown in FIG. 3. Specifically, a thickness of the electrode shaft 33a is reduced from the same thickness as that of the base 7 at a root in a stepwise manner in the middle of the minus direction of the Y axis, and becomes the same as the thickness of the movable electrode 21. The two movable electrodes 21c branched from the electrode shaft 33a also have the same thickness as the movable electrode 21.

On the other hand, a thickness of the fixed electrode 11c in the fixed electrode group 80a in the Z direction is set to be the same as a thickness of the fixed electrode 11 in the fixed electrode group 10a of the first embodiment shown in FIG. 3. The same applies to the N-type detector 76n.

A thickness of the movable electrode 22c in the movable electrode group 70b in the P-type detector 75p in the Z direction is set to be the same as the thickness of the movable electrode 22 in the movable electrode group 20b of the first embodiment shown in FIG. 4. Specifically, the thickness of the movable electrode 22c is the same as the thickness of the base 7.

On the other hand, a thickness of the fixed electrode 12c in the fixed electrode group 80b in the Z direction is set to be the same as the thickness of the fixed electrode 12 in the fixed electrode group 10b of the first embodiment shown in FIG. 4. Specifically, an entire thickness (height) in the fixed electrode group 80b including the three fixed electrodes 12c is set to be thinner (lower) than the fixed electrode group 80a and is the same as the thickness of the fixed electrode 12. The same applies to the P-type detector 76p.

Accordingly, an overlapping manner in the Z direction of the N-type detectors 75n and 76n and the P-type detectors 75p and 76p in the initial state is the same as that in FIG. 5. A behavior when an acceleration is applied is also the same as that in FIG. 5.

Therefore, acceleration in plus/minus directions of the Z axis can be detected by detecting changes in overlapping areas in the N-type detectors 75n and 76n and the P-type detectors 75p and 76p as changes in static capacitance.

As described above, according to the acceleration sensor 110 as a physical quantity sensor of the embodiment, the following effects can be obtained in addition to the effects of the above embodiments.

With the configuration of the acceleration sensor 110 including the N-type detector 75n, the P-type detector 75p, the P-type detector 76p, and the N-type detector 76n at the base 7 in this order from the second coupling portion 6b side, acceleration can be detected similarly as the acceleration sensor 100.

Therefore, the acceleration sensor 110 has a good weight balance of the movable body 8b and high detection accuracy.

Accordingly, it is possible to provide the acceleration sensor 110 in which sensitivity of other axes is reduced and the detection accuracy is high.

Third Embodiment

Different Aspect of Sensor Element-2

FIG. 8 is a plan view of a sensor element according to a third embodiment, and corresponds to FIG. 1.

In the above embodiment, the movable body 8 has a frame-shaped configuration in which the base 7 is supported by the two pillars, which are the first coupling portion 6a and the second coupling portion 6b, but the present disclosure is not limited to this configuration, and any configuration may be used as long as the base can be swingably supported.

For example, an acceleration sensor 120 of the embodiment adopts a configuration in which a base 77 is supported by one support arm 66. Hereinafter, the same reference signs are given to the same portions as those of the above embodiment, and redundant description thereof will be omitted.

As shown in FIG. 8, in the acceleration sensor 120 of the embodiment, a sensor element 52 is supported by two fixed portions, which are a first fixed portion 43a and a second fixed portion 43b. In other words, a fixed portion includes the first fixed portion 43a and the second fixed portion 43b separated from the first fixed portion 43a at an opposite side of the first direction. Here, the center line 60 is a line segment passing through centers of the first fixed portion 43a and the second fixed portion 43b and extending along the Y axis. Although there are two fixed portions here, when three or more fixed portions are provided, the center line 60 is a line segment passing through a center of a combination of the three or more fixed portions and extending along the Y axis.

A support beam includes a first rotation spring 64a having one end fixed to the first fixed portion 43a and serving as a first support beam extending in the minus direction of the X axis at the opposite side of the first direction, and a second rotation spring 64b having one end fixed to the second fixed portion 43b and serving as a second support beam extending in the plus direction of the X axis.

The support arm 66 is a coupling portion, is provided at the center line 60, and extends in the Y direction. One end of the support arm 66 is coupled to the other end of the first rotation spring 64a and the other end of the second rotation spring 64b.

The other end of the support arm 66 is coupled to a center of the base 77. The base 77 is a plate-shaped member extending in the X direction. A portion of the base 77 at the plus side of the X axis with respect to the center line 60 is also referred to as a first base 77a, and a portion at the minus side of the X axis with respect to the center line 60 is also referred to as a second base 77b.

In other words, a movable body 85 includes the support arm 66 having one end coupled to the other end of the first fixed portion 43a and the other end of the second fixed portion 43b and serving as a coupling portion extending in the plus direction of the Y axis, the first base 77a coupled to the other end of the support arm 66 and extending in the plus direction of the X axis, and the second base 77b coupled to the other end of the support arm 66 and extending in the minus direction of the X axis at the opposite side of the first direction.

The acceleration sensor 120 includes the N-type detector 25n, the P-type detector 25p, the P-type detector 26p, and the N-type detector 26n at the base 77 in this order from the minus side of the X axis. That is, the pair of the N-type detector 25n and the P-type detector 25p and the pair of the N-type detector 26n and the P-type detector 26p are provided line-symmetrically with the center line 60 as an axis of symmetry.

In other words, the movable electrode group 20a of the N-type detector 25n and the movable electrode group 20b of the P-type detector 25p are coupled to the second base 77b, and the movable electrode group 20c of the P-type detector 26p and the movable electrode group 20d of the N-type detector 26n are coupled to the first base 77a.

As described above, according to the acceleration sensor 120 as a physical quantity sensor of the embodiment, the following effects can be obtained in addition to the effects of the above embodiments.

According to the acceleration sensor 120, the fixed portion includes the first fixed portion 43a, and the second fixed portion 43b disposed away from the first fixed portion 43a at the opposite side of the first direction, the support beam includes the first rotation spring 64a as the first support beam having the one end fixed to the first fixed portion 43a and extending in the minus direction of the X axis at the opposite side of the first direction, and the second rotation spring 64b as the second support beam having the one end fixed to the second fixed portion 43b and extending in the plus direction of the X axis, the movable body 85 includes the support arm 66 as a coupling portion having the one end coupled to the other end of the first fixed portion 43a and the other end of the second fixed portion 43b and extending in the plus direction of the Y axis, the first base 77a coupled to the other end of the support arm 66 and extending in the plus direction of the X axis, and the second base 77b coupled to the other end of the support arm 66 and extending in the minus direction of the X axis at the opposite side of the first direction, the movable electrode group 20a of the N-type detector 25n and the movable electrode group 20b of the P-type detector 25p are coupled to the second base 77b, and the movable electrode group 20c of the P-type detector 26p and the movable electrode group 20d of the N-type detector 26n are coupled to the first base 77a.

Accordingly, the number of the movable electrodes 21 and 22 at the left side and the number of the movable electrodes 21 and 22 at the right side are the same with the center line 60 as the axis of symmetry, and it is possible to make a weight balance between left and right of the movable body 85 uniform. Further, in the configuration in which the base 77 is supported by one support arm 66, the support arm 66 is supported by the first fixed portion 43a and the second fixed portion 43b at two positions, so that a stable structure can be obtained.

Therefore, the acceleration sensor 120 has a good weight balance of the movable body 85 and high detection accuracy.

Accordingly, it is possible to provide the acceleration sensor 120 in which sensitivity of other axes is reduced and the detection accuracy is high.

Fourth Embodiment

Different Aspect of Sensor Element-3

Figure 9:
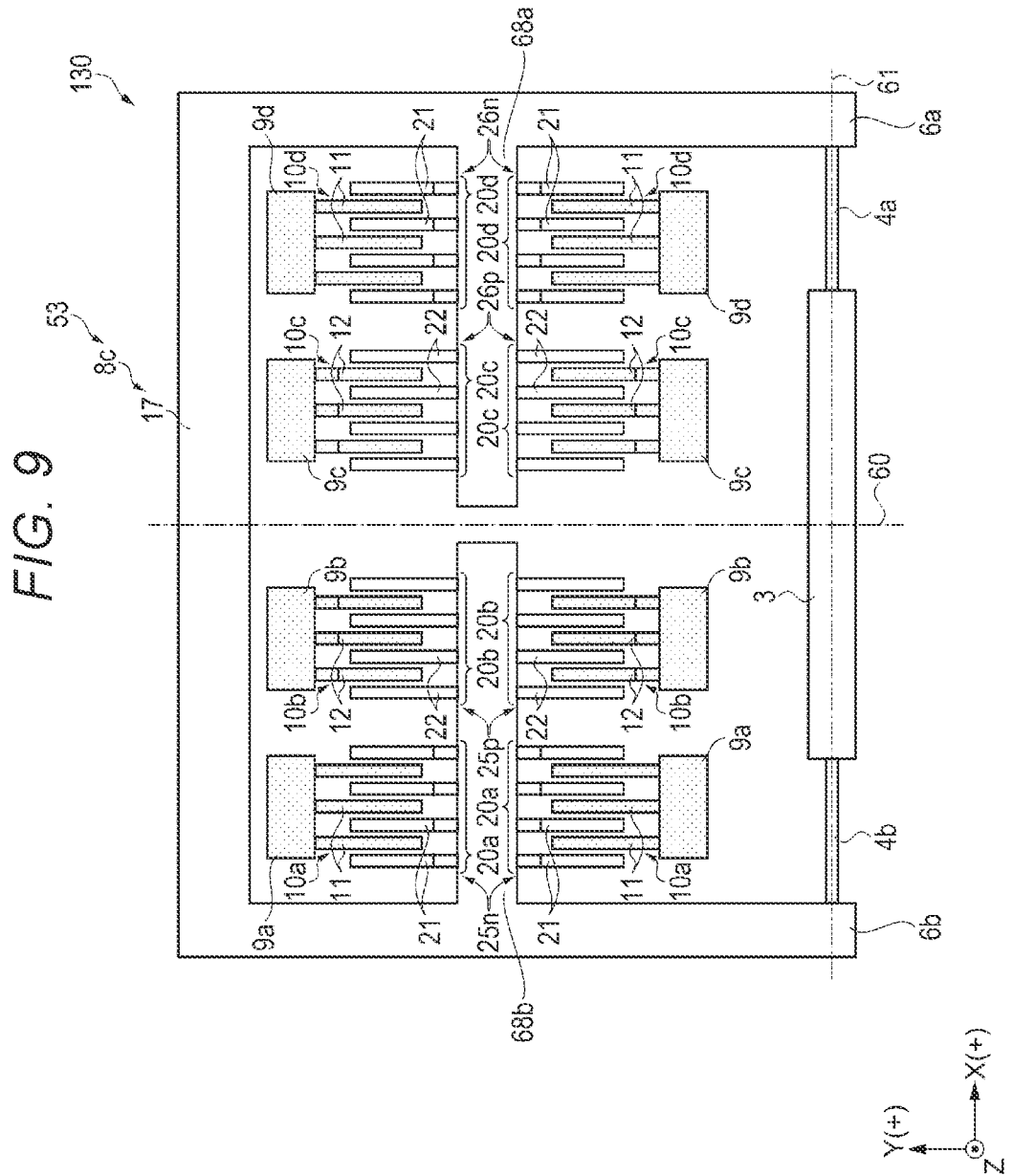
FIG. 9 is a plan view of a sensor element according to a fourth embodiment.

FIG. 9 is a plan view of a sensor element according to a fourth embodiment, and corresponds to FIG. 1.

In the above embodiment, the movable electrodes 21 and 22 are provided at one side (minus side of the Y axis) of the base 7 in the movable body 8, but the present disclosure is not limited to this configuration, and the movable electrodes 21 and 22 may be provided at both sides of a base.

For example, an acceleration sensor 130 of the embodiment includes a first base 68a branched from the first coupling portion 6a, and adopts a configuration in which the movable electrodes 21 and 22 are provided at both sides of the first base 68a. A second base 68b which is left-right symmetrical to the first base 68a is provided at the second coupling portion 6b side. Hereinafter, the same reference signs are given to the same portions as those of the above embodiment, and redundant description thereof will be omitted.

As shown in FIG. 9, a sensor element 53 of the acceleration sensor 130 of the embodiment includes the first base 68a branched from the first coupling portion 6a in the minus direction of the X axis and the second base 68b branched from the second coupling portion 6b in the plus direction of the X axis. The first base 68a and the second base 68b are not coupled to each other, and are separated from each other with the center line 60 therebetween. In other words, a movable body 8c includes the first base 68a extending from the first coupling portion 6a in the minus direction of the X axis which is opposite to the first direction, and the second base 68b extending from the second coupling portion 6b in the plus direction of the X axis.

The other end of the first base 68a and the other end of the second coupling portion 6b are coupled by a coupling beam 17. The coupling beam 17 is a beam corresponding to the base 7 in FIG. 1, and constitutes an outer side of the rectangular movable body 8c.

The N-type detector 25n and the P-type detector 25p are provided in this order from the second coupling portion 6b side at a side of the second base 68b at the minus side of the Y axis. The N-type detector 25n and the P-type detector 25p are also provided in this order from the second coupling portion 6b side at a side at the plus side of the Y axis. That is, four detectors including two N-type detectors 25n and two P-type detectors 25p are provided at both sides of the second base 68b in the Y direction.

The P-type detector 26p and the N-type detector 26n are provided in this order from a center line 60 side at a side of the first base 68a at the minus side of the Y axis. The P-type detector 26p and the N-type detector 26n are provided in this order from the center line 60 side at a side at the plus side of the Y axis. That is, four detectors including the two P-type detectors 26p and the two N-type detectors 26n are provided at both sides of the first base 68a in the Y direction.

Thus, the first base 68a including the four detectors and the second base 68b including the four detectors are provided line-symmetrically with the center line 60 as an axis of symmetry. The present disclosure is not limited to the configuration in which the detectors are provided at both sides of the first base 68a and the second base 68b. Any configuration may be adopted as long as the configuration is left-right symmetrical, and a detector may be provided at only one of sides.

In other words, the movable electrode group 20a of the N-type detector 25n and the movable electrode group 20b of the P-type detector 25p are coupled to the second base 68b, and the movable electrode group 20c of the P-type detector 26p and the movable electrode group 20d of the N-type detector 26n are coupled to the first base 68a.

As described above, according to the acceleration sensor 130 as a physical quantity sensor of the embodiment, the following effects can be obtained in addition to the effects of the above embodiments.

According to the acceleration sensor 130, the support beam includes the first rotation spring 4a having the one end fixed to the fixed portion 3 and extending in the first direction, and the second rotation spring 4b having the one end fixed to the fixed portion 3 and extending in the opposite direction of the first direction, the movable body 8c includes the first coupling portion 6a having the one end coupled to the other end of the first rotation spring 4a and extending in the second direction, the second coupling portion 6b having the one end coupled to the other end of the second rotation spring 4b and extending in the second direction, the first base 68a extending from the first coupling portion 6a in the minus direction of the X axis which is opposite to the first direction, and the second base 68b extending from the second coupling portion 6b in the plus direction of the X axis. The movable electrode group 20a of the N-type detector 25n and the movable electrode group 20b of the P-type detector 25p are coupled to the second base 68b, and the movable electrode group 20c of the P-type detector 26p and the movable electrode group 20d of the N-type detector 26n are coupled to the first base 68a.

Accordingly, since the first base 68a including the four detectors and the second base 68b including the four detectors are provided symmetrically with the center line 60 as the axis of symmetry, it is possible to make a weight balance between left and right of the movable body 8c uniform. Further, since four detectors are provided in each of the first base 68a and the second base 68b and a total of eight detectors are provided, detection sensitivity of acceleration becomes higher.

Therefore, the acceleration sensor 130 has a good weight balance of the movable body 8c and high detection accuracy.

Accordingly, it is possible to provide the acceleration sensor 130 in which sensitivity of other axes is reduced and the detection accuracy is high.

Fifth Embodiment

Different Aspect of Sensor Element-4

Figure 10:
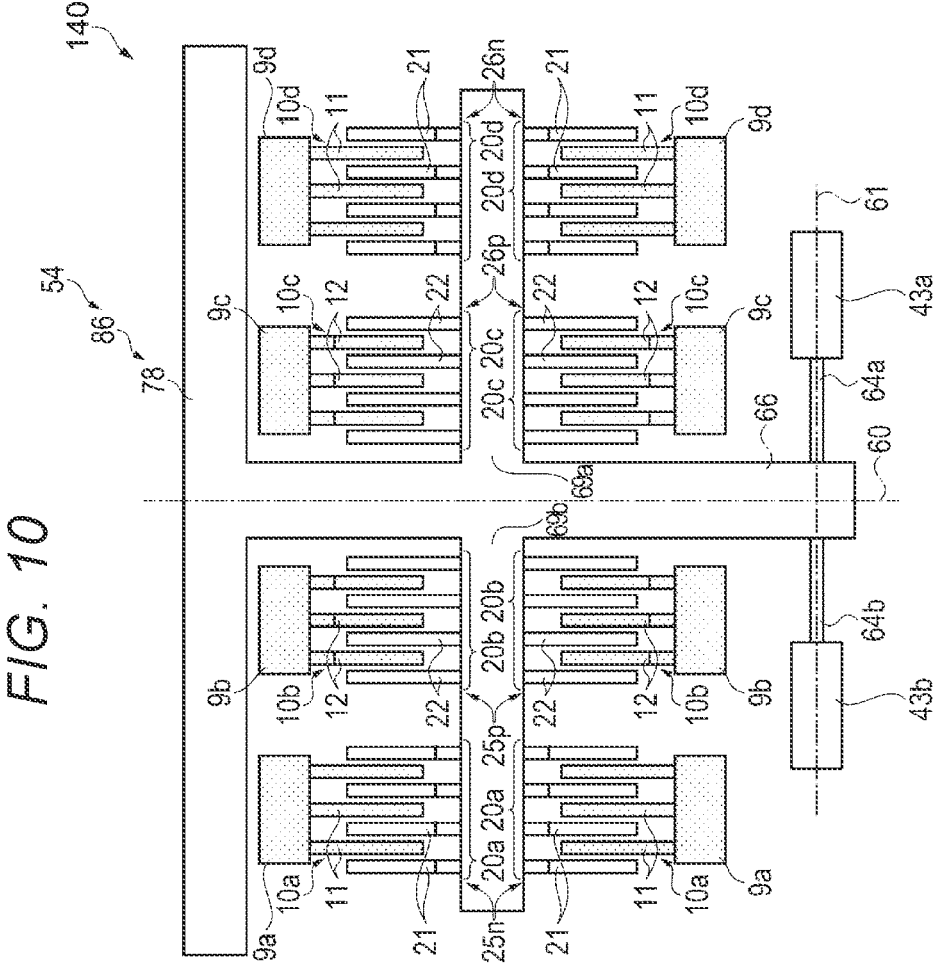
FIG. 10 is a plan view of a sensor element according to a fifth embodiment.
Figure 10:
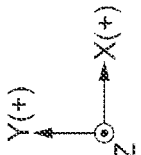

FIG. 10 is a plan view of a sensor element according to a fifth embodiment, and corresponds to FIGS. 1 and 9.

The configuration in which the detectors are provided at the both sides of the first base 68a and the second base 68b described in the fourth embodiment can also be applied to a structure in which a movable portion is supported by one support arm. Hereinafter, the same reference signs are given to the same portions as those of the above embodiment, and redundant description thereof will be omitted.

As shown in FIG. 10, an acceleration sensor 140 of the embodiment adopts a configuration in which a movable body 86 is supported by one support arm 66, similarly to the configuration in FIG. 8.

In the acceleration sensor 140, a sensor element 54 is supported by two fixed portions, which are the first fixed portion 43a and the second fixed portion 43b. In other words, a fixed portion includes the first fixed portion 43a and the second fixed portion 43b separated from the first fixed portion 43a at the opposite side of the first direction.

A support beam includes a first rotation spring 64a having one end fixed to the first fixed portion 43a and serving as a first support beam extending in the minus direction of the X axis at the opposite side of the first direction, and a second rotation spring 64b having one end fixed to the second fixed portion 43b and serving as a second support beam extending in the plus direction of the X axis.

The support arm 66 is a coupling portion, is provided at the center line 60, and extends in the Y direction. One end of the support arm 66 is coupled to the other end of the first rotation spring 64a and the other end of the second rotation spring 64b.

The other end of the support arm 66 is coupled to a center of a weight beam 78. The weight beam 78 is a weight member for increasing moment of inertia of the movable body 86, and is a plate-shaped member extending in the X direction. The support arm 66 is provided with a first base 69*a* branched from the support arm 66 in the plus direction of the X axis and a second base 69*b* branched from the support arm 66 in the minus direction of the X axis. The first base 69*a* and the second base 69*b* are provided symmetrically with the center line 60 as an axis of symmetry. In other words, the movable body 86 includes the first base 69*a* coupled to the support arm 66 and extending in the plus direction of the X axis, and the second base 69*b* coupled to the support arm 66 and extending in the minus direction of the X axis at the opposite side of the first direction.

The N-type detector 25*n* and the P-type detector 25*p* are provided in this order from the minus side of the X axis at a side of the second base 69*b* at the minus side of the Y axis. The N-type detector 25*n* and the P-type detector 25*p* are also provided in this order from the minus side of the X axis at a side at the plus side of the Y axis. That is, four detectors including two N-type detectors 25*n* and two P-type detectors 25*p* are provided at both sides of the second base 69*b* in the Y direction.

The P-type detector 26*p* and the N-type detector 26*n* are provided in this order from a support arm 66 side at a side of the first base 69*a* at the minus side of the Y axis. The P-type detector 26*p* and the N-type detector 26*n* are provided in this order from the support arm 66 side at a side at the plus side of the Y axis. That is, four detectors including two P-type detectors 26*p* and two N-type detectors 26*n* are provided at both sides of the first base 69*a* in the Y direction.

Thus, the first base 69*a* including the four detectors and the second base 69*b* including the four detectors are provided line-symmetrically with the center line 60 as the axis of symmetry. The present disclosure is not limited to the configuration in which the detectors are provided at both sides of the first base 69*a* and the second base 69*b*. Any configuration may be adopted as long as the configuration is left-right symmetrical, and a detector may be provided at only one of sides.

In other words, the movable electrode group 20*a* of the N-type detector 25*n* and the movable electrode group 20*b* of the P-type detector 25*p* are coupled to the second base 69*b*, and the movable electrode group 20*c* of the P-type detector 26*p* and the movable electrode group 20*d* of the N-type detector 26*n* are coupled to the first base 69*a*.

As described above, according to the acceleration sensor 140 as a physical quantity sensor of the embodiment, the following effects can be obtained in addition to the effects of the above embodiments.

According to the acceleration sensor 140, the fixed portion includes the first fixed portion 43*a*, and the second fixed portion 43*b* disposed away from the first fixed portion 43*a* at the opposite side of the first direction, the support beam includes the first rotation spring 64*a* as the first support beam having the one end fixed to the first fixed portion 43*a* and extending in the minus direction of the X axis at the opposite side of the first direction, and the second rotation spring 64*b* as a second support beam having the one end fixed to the second fixed portion 43*b* and extending in the plus direction of the X axis, the movable body 86 includes the support arm 66 as a coupling portion having the one end coupled to the other end of the first fixed portion 43*a* and the other end of the second fixed portion 43*b* and extending in the plus direction of the Y axis, the first base 69*a* coupled to the support arm 66 and extending in the plus direction of the X axis, and the second base 69*b* coupled to the support arm 66 and extending in the minus direction of the X axis at the opposite side of the first direction, the movable electrode group 20*a* of the N-type detector 25*n* and the movable electrode group 20*b* of the P-type detector 25*p* are coupled to the second base 69*b*, and the movable electrode group 20*c* of the P-type detector 26*p* and the movable electrode group 20*d* of the N-type detector 26*n* are coupled to the first base 69*a*.

Accordingly, since the first base 69*a* including the four detectors and the second base 69*b* including the four detectors are provided symmetrically with the center line 60 as the axis of symmetry, it is possible to make a weight balance between left and right of the movable body 86 uniform. Further, since four detectors are provided in each of the first base 69*a* and the second base 69*b* and a total of eight detectors are provided, detection sensitivity of acceleration becomes higher.

Therefore, the acceleration sensor 140 has a good weight balance of the movable body 86 and high detection accuracy.

Accordingly, it is possible to provide the acceleration sensor 140 in which sensitivity of other axes is reduced and the detection accuracy is high.

Sixth Embodiment

Modification of Thickness of Movable Electrode and Fixed Electrode

Figure 11:
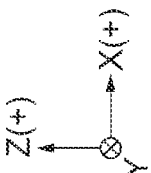
FIG. 11 is a diagram of a detection principle of acceleration according to a sixth embodiment.

FIG. 11 is a diagram of a detection principle of acceleration according to a sixth embodiment and corresponds to FIG. 5.

In the above embodiment, in the initial state, the positions of the ends of the fixed electrode 11 and the movable electrode 21 of the N-type detector 25*n* at the minus side of the Z axis coincide with each other, and the positions of ends of the fixed electrode 12 and the movable electrode 22 of the P-type detector 25*p* at the minus side of the Z axis coincide with each other, but the present disclosure is not limited to this configuration, and the above positions may not coincide with each other. Hereinafter, the same reference signs are given to the same portions as those of the above embodiment, and redundant description thereof will be omitted.

In the embodiment, in an initial state, a position of an end of the movable electrode 21 of the N-type detector 25*n* at the minus side of the Z axis protrudes by a dimension d from a position of an end of the fixed electrode 11.

In the P-type detector 25*p*, a position of an end of the fixed electrode 12 at the minus side of the Z axis protrudes by the dimension d from a position of an end of the movable electrode 22. That is, compared with the initial state in FIG. 5, the positions of the movable electrode 21 and the fixed electrode 12 are shifted in the minus direction of the Z axis by the dimension d. Other configurations are similar as those described in the first embodiment.

When acceleration in the plus direction of the Z axis occurs, the movable electrode 21 of the N-type detector 25*n* and the movable electrode 22 of the P-type detector 25*p* are displaced to the minus side of the Z axis by receiving an inertial force accompanying the acceleration. At this time, an overlapping area between the fixed electrode 11 and the movable electrode 21 in the N-type detector 25*n* is smaller than an initial area due to the displacement of the movable electrode 21 in the minus direction of the Z axis. That is, static capacitance decreases.

On the other hand, an overlapping area between the fixed electrode 12 and the movable electrode 22 in the P-type detector 25*p* is larger than the initial area due to the displacement of the movable electrode 22 in the minus direction of the Z axis. That is, static capacitance increases. Here, in the configuration in FIG. 5, there is no change in the overlapping area in the P-type detector, but according to the configuration in the embodiment, acceleration can be detected even in the P-type detector. In other words, since detection can be performed by the P-type detector in addition to the N-type detector, the detection can be performed with higher accuracy.

Next, when acceleration in the minus direction of the Z axis occurs, the movable electrode 21 of the N-type detector 25$n$ and the movable electrode 22 of the P-type detector 25$p$ are displaced to the plus side of the Z axis by receiving an inertial force accompanying the acceleration. At this time, the overlapping area between the fixed electrode 11 and the movable electrode 21 in the N-type detector 25$n$ is larger than the initial area due to the displacement of the movable electrode 21 in the plus direction of the Z axis. That is, static capacitance increases. Here, in the configuration in FIG. 5, there is no change in the overlapping area in the N-type detector, but according to the configuration in the embodiment, acceleration can be detected even in the N-type detector. In other words, since detection can be performed by the N-type detector in addition to the P-type detector, the detection can be performed with higher accuracy.

On the other hand, the overlapping area between the fixed electrode 12 and the movable electrode 22 in the P-type detector 25$p$ is smaller than the initial area due to the displacement of the movable electrode 22 in the plus direction of the Z axis.

Thus, according to the configuration in the embodiment, when acceleration in the plus direction of the Z axis occurs, the overlapping area in the N-type detector 25$n$ decreases, and the overlapping area in the P-type detector 25$p$ increases. When acceleration in the minus direction of the Z axis occurs, the overlapping area in the N-type detector 25$n$ increases, and the overlapping area in the P-type detector 25$p$ decreases.

As a result, regardless of whether acceleration in the plus/minus directions of the Z axis is applied, the acceleration can be more accurately detected by the detectors at both poles by the P-type detector and the N-type detector.

Although a case where the configuration in FIG. 11 is applied to the acceleration sensor 100 is described above, the configuration in FIG. 11 can be applied to the acceleration sensors 110, 120, 130, and 140 of other embodiments, and similar operation and effect can be obtained.

Seventh Embodiment

Inertial Measurement Unit

Figure 12:
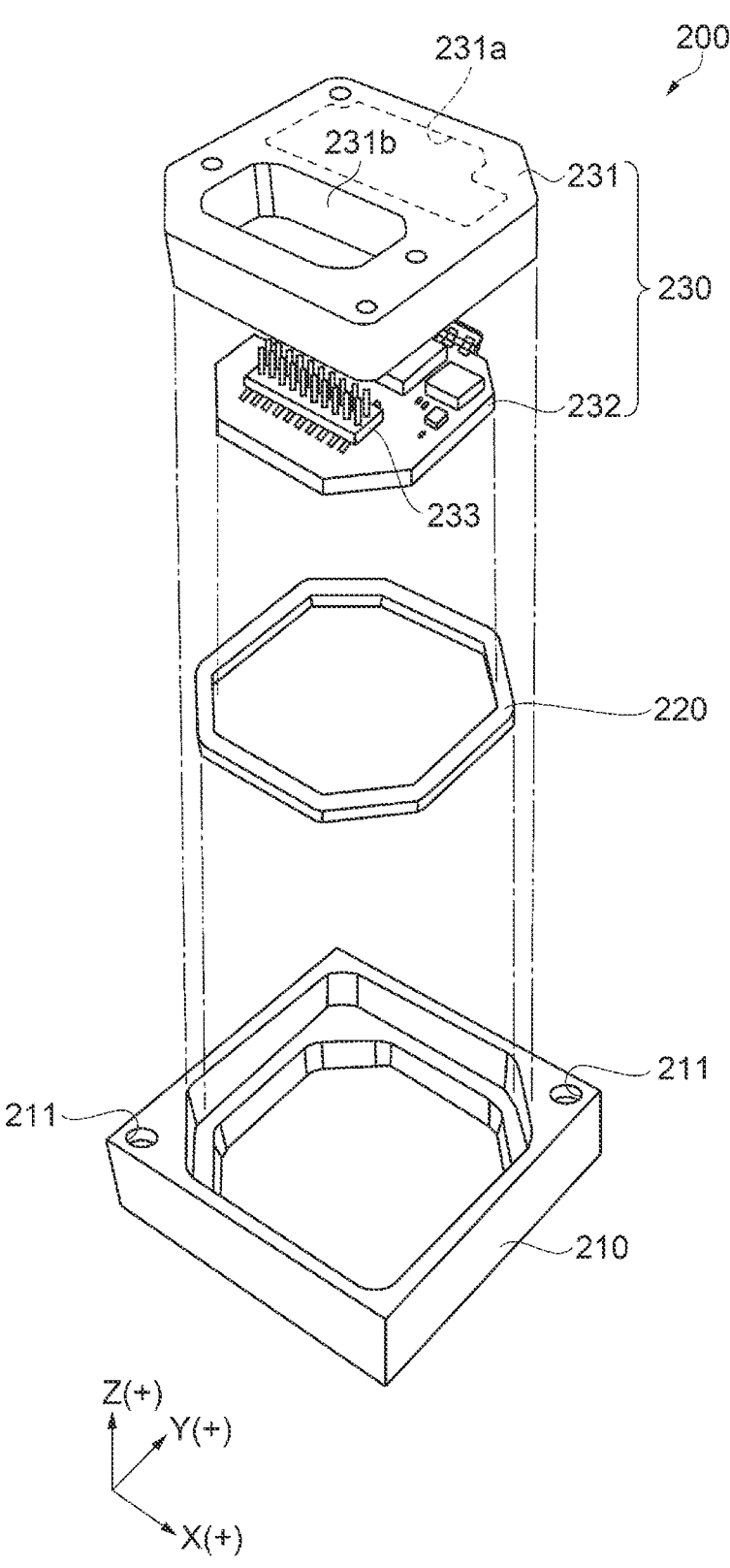
FIG. 12 is an exploded perspective view of an inertial measurement unit according to a seventh embodiment.
Figure 13:
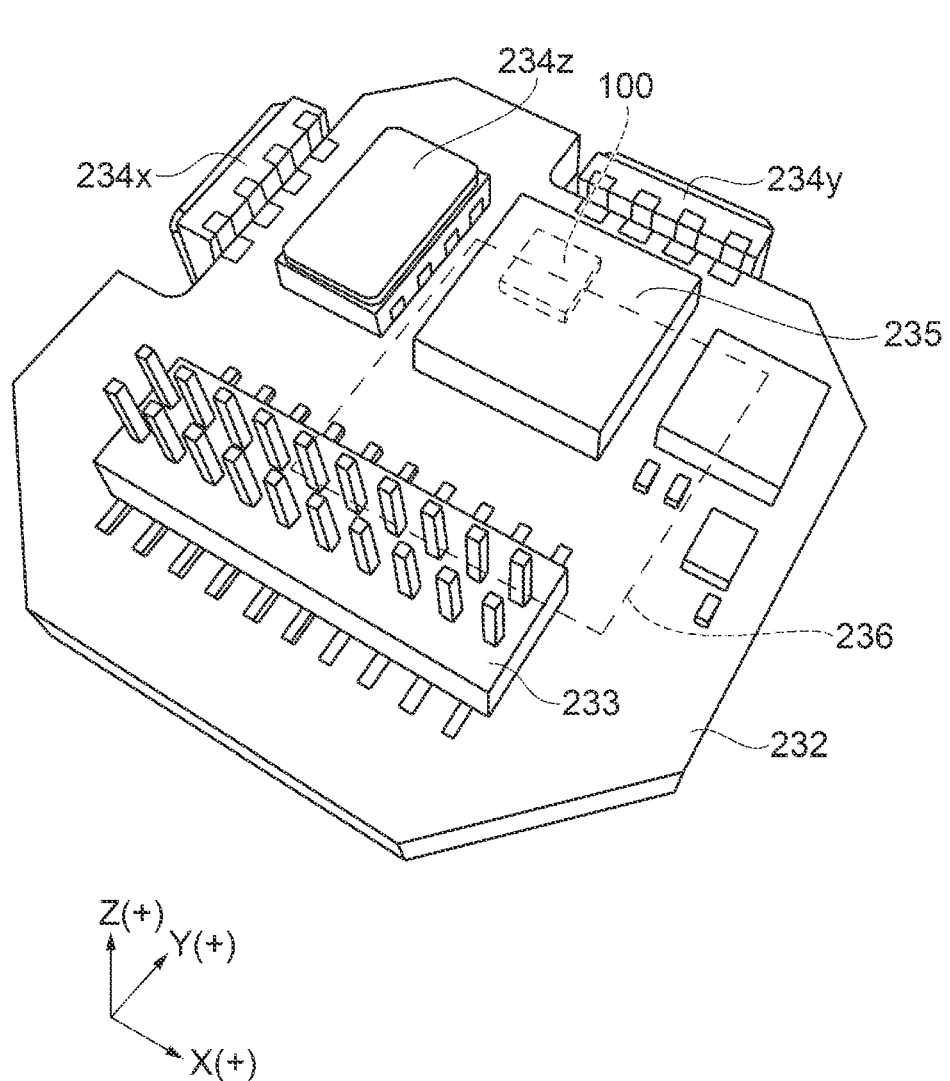
FIG. 13 is a perspective view of a circuit board.

FIG. 12 is an exploded perspective view of an inertial measurement unit according to a seventh embodiment. FIG. 13 is a perspective view of a circuit board. Next, an example of an inertial measurement unit 200 according to the embodiment will be described with reference to FIGS. 12 and 13.

The inertial measurement unit (IMU) 200 shown in FIG. 12 is a unit which detects an inertial movement amount of a posture or a behavior of a moving body such as an automobile or a robot. An object to be mounted is not limited to a moving body such as an automobile, and may be, for example, a building such as a bridge or an elevated track. When the inertial measurement unit 200 is attached to a building, the inertial measurement unit 200 is used as a structural health monitoring system for checking health of the building.

The inertial measurement unit 200 is a so-called six-axis motion sensor including an acceleration sensor for detecting acceleration in directions along three axes and an angular velocity sensor for detecting angular velocities around three axes.

The inertial measurement unit 200 is a rectangular parallelepiped having a substantially square planar shape. Screw holes 211 are formed in the vicinity of two vertices positioned in a diagonal direction of the square. Two screws can be inserted into the two screw holes 211 to fix the inertial measurement unit 200 to a mounted surface of an object to be mounted such as an automobile. By selecting a component or changing a design, it is also possible to reduce a size to a size which can be mounted on a smartphone or a digital camera, for example.

The inertial measurement unit 200 includes an outer case 210, a bonding member 220, and a sensor module 230, and has a configuration in which the sensor module 230 is inserted inside the outer case 210 with the bonding member 220 interposed therebetween. The sensor module 230 includes an inner case 231 and a circuit board 232. The inner case 231 is provided with a recess 231$a$ for preventing contact with the circuit board 232 and an opening 231$b$ for exposing a connector 233 to be described later. The circuit board 232 is bonded to a lower surface of the inner case 231 via an adhesive.

As shown in FIG. 13, the connector 233, an angular velocity sensor 234$z$ for detecting an angular velocity around the Z axis, an acceleration sensor unit 235 for detecting acceleration in each axial direction of the X axis, the Y axis, and the Z axis, and the like are mounted at an upper surface of the circuit board 232.

An angular velocity sensor 234$x$ for detecting an angular velocity around the X axis and an angular velocity sensor 234$y$ for detecting an angular velocity around the Y axis are mounted at a side surface of the circuit board 232.

The acceleration sensor unit 235 includes at least the acceleration sensor 100 for measuring the acceleration in the Z axis direction above, and can detect acceleration in one axial direction or acceleration in two axial directions or three axial directions as necessary. The acceleration sensors 110, 120, 130, and 140 may be used instead of the acceleration sensor 100.

The angular velocity sensors 234$x$, 234$y$, and 234$z$ are not particularly limited, and for example, a vibration gyro sensor using a Coriolis force can be used.

The control IC 236 as a controller is mounted at a lower surface of the circuit board 232.

The control IC 236 is, for example, a micro controller unit (MCU), includes a storage including a nonvolatile memory, an A/D converter, and the like, and controls each part of the inertial measurement unit 200. The storage stores a program defining an order and contents for detecting acceleration and an angular velocity, an inspection program defining an inspection method of a detection function of the acceleration sensor 100, accompanying data, and the like. A plurality of electronic components are mounted on the circuit board 232. In other words, the inertial measurement unit 200 includes the acceleration sensor 100 as the physical quantity sensor, and the control IC 236 as the controller which performs control based on a detection signal output from the acceleration sensor 100.

The inertial measurement unit 200 is not limited to the configuration in FIGS. 12 and 13, and may have, for example, a configuration in which only the acceleration sensor 100 is provided as the physical quantity sensor without providing the angular velocity sensors 234$x$, 234$y$, and 234z. In this case, for example, by forming the acceleration sensor 100 and the control IC 236 as one mounting package, the inertial measurement unit 200 can be provided as a one-chip mounting component.

As described above, according to the inertial measurement unit 200 of the embodiment, the following effects can be obtained in addition to the effects of the above embodiments.

The inertial measurement unit 200 includes the acceleration sensor 100 as the physical quantity sensor, and the control IC 236 as the controller which performs control based on a detection signal output from the acceleration sensor 100.

Accordingly, the inertial measurement unit 200 includes the acceleration sensor 100 in which sensitivity of other axes is reduced and the detection accuracy is high. Therefore, it is possible to provide the inertial measurement unit 200 having high detection accuracy and excellent reliability.

What is claimed is:

1. A physical quantity sensor comprising:
when directions orthogonal to one another are a first direction, a second direction, and a third direction,
a fixed portion fixed to a base body, the fixed portion extending along the first direction;
a support beam having one end coupled to the fixed portion and extending along the first direction;
a fixed electrode portion provided at the base body; and
a movable body, wherein
the fixed electrode portion includes
a first pedestal provided at the base body,
a first fixed electrode group including a plurality of first fixed electrodes that extend from the first pedestal along the second direction,
a second pedestal provided at the base body,
a second fixed electrode group including a plurality of second fixed electrodes that extend from the second pedestal along the second direction,
a third pedestal provided at the base body,
a third fixed electrode group including a plurality of third fixed electrodes that extend from the third pedestal along the second direction,
a fourth pedestal provided at the base body, and
a fourth fixed electrode group including a plurality of fourth fixed electrodes that extend from the fourth pedestal along the second direction,
the movable body includes a movable electrode portion,
the movable electrode portion includes
a first movable electrode group including a plurality of first movable electrodes respectively facing the plurality of first fixed in the first direction,
a second movable electrode group including a plurality of second movable electrodes respectively facing the plurality of second fixed electrodes in the first direction,
a third movable electrode group including a plurality of third movable electrodes respectively facing the plurality of third fixed electrodes in the first direction, and
a fourth movable electrode group including a plurality of fourth movable electrodes respectively facing the plurality of fourth fixed electrodes in the first direction,
the first movable electrode group, the second movable electrode group, the third movable electrode group, and the fourth movable electrode group are arranged in this order along the first direction, a thickness along the third direction of each of the plurality of second movable electrodes is different from a thickness along the third direction of each of the plurality of first movable electrodes,
a thickness along the third direction of each of the plurality of third movable electrodes is different from a thickness along the third direction of each of the plurality of fourth movable electrodes,
when an imaginary line extending in the second direction from a center of the fixed portion is an axis of symmetry, the first movable electrode group is disposed line-symmetrically with the fourth movable electrode group, and the second movable electrode group is disposed line-symmetrically with the third movable electrode group,
the fixed portion aligns with the second and third pedestals along the second direction,
a damper is configured to damp a rotational vibration of the movable body about the third direction as a rotation axis,
the damper is configured with fixed comb teeth and movable comb teeth that face each other along the first direction,
the movable comb teeth are connected to the movable body, and the fixed comb teeth are fixed to the base body, and
the fixed comb teeth extend along the second direction, and the movable comb teeth extend along the second direction.

2. The physical quantity sensor according to claim 1, wherein
the support beam includes
a first support beam having one end fixed to the fixed portion and extending in the first direction, and
a second support beam having one end fixed to the fixed portion and extending in an opposite direction of the first direction,
the movable body includes
a first coupling portion having one end side coupled to the other end of the first support beam and extending in the second direction,
a second coupling portion having one end side coupled to the other end of the second support beam and extending in the second direction, and
a base coupling the first coupling portion to the second coupling portion and extending in the first direction, and
the first movable electrode group, the second movable electrode group, the third movable electrode group, and the fourth movable electrode group are coupled to the base of the movable body.

3. The physical quantity sensor according to claim 1, wherein
the fixed portion includes
a first fixed portion, and
a second fixed portion disposed away from the first fixed portion in an opposite direction of the first direction,
the support beam includes
a first support beam having one end fixed to the first fixed portion and extending in the opposite direction of the first direction, and
a second support beam having one end fixed to the second fixed portion and extending in the first direction, the movable body includes a coupling portion having one end side coupled to the other end of the first support beam and the other end of the second support beam and extending in the second direction, a first base coupled to the other end side of the coupling portion and extending in the first direction, and a second base coupled to the other end side of the coupling portion and extending in the opposite direction of the first direction, the first movable electrode group and the second movable electrode group are coupled to the second base, and the third movable electrode group and the fourth movable electrode group are coupled to the first base.

4. The physical quantity sensor according to claim 1, wherein the support beam includes a first support beam having one end fixed to the fixed portion and extending in the first direction, and a second support beam having one end fixed to the fixed portion and extending in an opposite direction of the first direction, the movable body includes a first coupling portion having one end side coupled to the other end of the first support beam and extending in the second direction, a second coupling portion having one end side coupled to the other end of the second support beam and extending in the second direction, a first base extending from the first coupling portion in the opposite direction of the first direction, and a second base extending from the second coupling portion in the first direction, the first movable electrode group and the second movable electrode group are coupled to the second base, and the third movable electrode group and the fourth movable electrode group are coupled to the first base.

5. The physical quantity sensor according to claim 1, wherein the fixed portion includes a first fixed portion, and a second fixed portion disposed away from the first fixed portion in an opposite direction of the first direction, the support beam includes a first support beam having one end fixed to the first fixed portion and extending in the opposite direction of the first direction, and a second support beam having one end fixed to the second fixed portion and extending in the first direction, the movable body includes a coupling portion having one end side coupled to the other end of the first support beam and the other end of the second support beam and extending in the second direction, a first base coupled to the coupling portion and extending in the first direction, and a second base coupled to the coupling portion and extending in the opposite direction of the first direction, the first movable electrode group and the second movable electrode group are coupled to the second base, and the third movable electrode group and the fourth movable electrode group are coupled to the first base.

6. An inertial measurement unit comprising:

the physical quantity sensor according to claim 1; and a controller configured to perform control based on a detection signal output from the physical quantity sensor.

* * * * *